US010328769B2

(12) United States Patent
Ferguson et al.

(10) Patent No.: US 10,328,769 B2
(45) Date of Patent: Jun. 25, 2019

(54) METHODS FOR INTERACTING WITH AUTONOMOUS OR SEMI-AUTONOMOUS VEHICLE

(71) Applicant: Nuro, Inc., Mountain View, CA (US)

(72) Inventors: David Ferguson, San Francisco, CA (US); Jiajun Zhu, Palo Alto, CA (US); Nan Ransohoff, San Francisco, CA (US)

(73) Assignee: NURO, INC., Mountain View, CA (US)

(*) Notice: Subject to any disclaimer, the term of this patent is extended or adjusted under 35 U.S.C. 154(b) by 0 days.

(21) Appl. No.: 16/048,124

(22) Filed: Jul. 27, 2018

(65) Prior Publication Data

US 2019/0033856 A1 Jan. 31, 2019

Related U.S. Application Data

(60) Provisional application No. 62/538,538, filed on Jul. 28, 2017.

(51) Int. Cl.
*G01C 22/00* (2006.01)
*G05D 1/00* (2006.01)
(Continued)

(52) U.S. Cl.
CPC ............ *B60H 1/00735* (2013.01); *A23L 5/00* (2016.08); *B60H 1/00364* (2013.01); *B60P 1/36* (2013.01); *B60P 3/007* (2013.01); *B60P 3/0257* (2013.01); *B60R 25/25* (2013.01); *B60R 25/252* (2013.01); *B65G 67/24* (2013.01); *G01C 21/20* (2013.01); *G01C 21/343* (2013.01); *G05D 1/0027* (2013.01); *G05D 1/0061* (2013.01); *G05D 1/0088* (2013.01); *G05D 1/0094* (2013.01); *G05D 1/0212* (2013.01); *G05D 1/0231* (2013.01); *G05D 1/0276* (2013.01);
(Continued)

(58) Field of Classification Search
CPC ...... G05D 1/0027; G05D 1/0088; B65G 6/29; G01C 21/343; G06K 9/00791; G06Q 10/083; G08G 1/16
USPC ...................................................... 701/23, 22
See application file for complete search history.

(56) References Cited

U.S. PATENT DOCUMENTS 3,064,252 A 11/1962 Varela
4,766,548 A 8/1988 Cedrone et al.
(Continued)

FOREIGN PATENT DOCUMENTS

JP H036407 A 1/1991
JP 2001256576 A 9/2001
(Continued)

OTHER PUBLICATIONS

American National Standard for Safe Use of Lasers. ANSI Z1136.1-2000 (§4.5.1.5; 4.5.1.3-4 and p. 5) (19 pgs) (2000).
(Continued)

*Primary Examiner* — Mahmoud S Ismail
(74) *Attorney, Agent, or Firm* — Wilson Sonsini Goodrich & Rosati

(57) ABSTRACT

Provided herein is a system for precise delivery of an item to a consumer by an autonomous or semi-autonomous vehicle. The system performs image recognition algorithms to detect a primary entrance, navigate from a street address to the primary entrance, and to validate the customer upon delivery.

57 Claims, 18 Drawing Sheets

(51) Int. Cl.

| | | |
|---|---|---|
| B60H 1/00 | (2006.01) | |
| B65G 67/24 | (2006.01) | |
| G01C 21/34 | (2006.01) | |
| G06K 9/00 | (2006.01) | |
| G06Q 10/08 | (2012.01) | |
| G05D 1/02 | (2006.01) | |
| G06Q 10/06 | (2012.01) | |
| G06Q 50/28 | (2012.01) | |
| G06Q 30/06 | (2012.01) | |
| G06Q 50/30 | (2012.01) | |
| G07F 17/00 | (2006.01) | |
| G08G 1/00 | (2006.01) | |
| B60P 1/36 | (2006.01) | |
| G06K 7/10 | (2006.01) | |
| G06K 19/06 | (2006.01) | |
| G06K 19/07 | (2006.01) | |
| G06N 20/00 | (2019.01) | |
| B60P 3/025 | (2006.01) | |
| G06K 7/14 | (2006.01) | |
| G06Q 20/18 | (2012.01) | |
| G06Q 20/00 | (2012.01) | |
| G08G 1/04 | (2006.01) | |
| A23L 5/00 | (2016.01) | |
| G06Q 50/12 | (2012.01) | |
| H04W 4/024 | (2018.01) | |
| H04W 4/40 | (2018.01) | |
| G07F 17/12 | (2006.01) | |
| G06Q 30/02 | (2012.01) | |
| B60P 3/00 | (2006.01) | |
| G01C 21/20 | (2006.01) | |
| B60R 25/25 | (2013.01) | |
| H04L 29/08 | (2006.01) | |
| G06Q 20/12 | (2012.01) | |
| B60L 9/00 | (2019.01) | |
| B60L 11/00 | (2006.01) | |
| G05D 3/00 | (2006.01) | |
| G06F 7/00 | (2006.01) | |
| G06F 17/00 | (2019.01) | |
| G06F 3/0484 | (2013.01) | |
| H04N 5/76 | (2006.01) | |

(52) U.S. Cl.
CPC ....... *G05D 1/0291* (2013.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/083* (2013.01); *G06Q 10/0832* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0631* (2013.01); *G06Q 30/0645* (2013.01); *G06Q 50/12* (2013.01); *G06Q 50/28* (2013.01); *G06Q 50/30* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.01); *H04W 4/40* (2018.02); *G05D 2201/0213* (2013.01); *G06F 3/0484* (2013.01); *G08G 1/22* (2013.01); *H04N 5/76* (2013.01)

(56) References Cited

U.S. PATENT DOCUMENTS

| | | |
|---|---|---|
| 4,952,911 A | 8/1990 | D'Ambrosia et al. |
| 5,128,861 A | 7/1992 | Kagami et al. |
| 5,179,843 A | 1/1993 | Cohausz |
| 5,207,784 A | 5/1993 | Schwartzendruber et al. |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran et al. |
| 6,021,394 A | 2/2000 | Takahashi et al. |
| 6,034,803 A | 3/2000 | Sullivan et al. |
| 6,181,981 B1 | 1/2001 | Varga et al. |
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater et al. |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Glecker et al. |
| 7,281,891 B2 | 10/2007 | Smith et al. |
| 7,521,935 B2 | 4/2009 | Uchida et al. |
| 7,534,984 B2 | 5/2009 | Gleckler |
| D615,905 S | 5/2010 | Arnell |
| 7,798,885 B2 | 9/2010 | Wong et al. |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Prada et al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar |
| 9,256,852 B1 | 2/2016 | Myllymaki |
| 9,307,383 B1 | 4/2016 | Patrick |
| D755,673 S | 5/2016 | Ahn et al. |
| 9,383,753 B1 | 7/2016 | Templeton et al. |
| 9,488,984 B1 | 11/2016 | Williams et al. |
| 9,489,490 B1 | 11/2016 | Theobald et al. |
| 9,552,564 B1 | 1/2017 | Martenis |
| 9,613,346 B2 | 4/2017 | Crow et al. |
| 9,684,914 B1 | 6/2017 | Porter et al. |
| 9,741,010 B1 | 8/2017 | Heinla et al. |
| 9,786,187 B1 | 10/2017 | Bar-Zeev et al. |
| 9,815,633 B1 | 11/2017 | Kisser et al. |
| 9,824,394 B1 | 11/2017 | Boates et al. |
| 9,905,133 B1 | 2/2018 | Kumar et al. |
| 9,916,703 B2 | 3/2018 | Douillard et al. |
| 9,984,525 B2 | 5/2018 | Will et al. |
| 10,029,787 B1 | 7/2018 | Lesser et al. |
| 10,120,384 B2 | 11/2018 | Wilkinson et al. |
| 2002/0023594 A1 | 2/2002 | Greene et al. |
| 2003/0209375 A1 | 11/2003 | Suzuki et al. |
| 2004/0181570 A1 | 9/2004 | Kaneko et al. |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0182818 A1 | 8/2007 | Buehler et al. |
| 2007/0235465 A1 | 10/2007 | Walker et al. |
| 2010/0036717 A1 | 2/2010 | Trest |
| 2010/0219953 A1 | 9/2010 | Bloy et al. |
| 2010/0228405 A1 | 9/2010 | Morgal et al. |
| 2010/0234991 A1 | 9/2010 | Zini et al. |
| 2010/0301056 A1 | 12/2010 | Wolfe |
| 2011/0130134 A1 | 6/2011 | Van et al. |

(56) References Cited

U.S. PATENT DOCUMENTS

| | | |
|---|---|---|
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1 | 3/2013 | Pinkus et al. |
| 2013/0282472 A1 | 10/2013 | Penilla et al. |
| 2013/0307698 A1 | 11/2013 | Park et al. |
| 2014/0022051 A1 | 1/2014 | Levien et al. |
| 2014/0136414 A1 | 5/2014 | Abhyanker |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0358353 A1 | 12/2014 | Ibanez-Guzman et al. |
| 2014/0380264 A1 | 12/2014 | Misra et al. |
| 2015/0006005 A1* | 1/2015 | Yu ................... G06Q 10/08 701/22 |
| 2015/0120094 A1 | 4/2015 | Kimchi et al. |
| 2015/0134546 A1 | 5/2015 | Penilla et al. |
| 2015/0149015 A1 | 5/2015 | Nakano et al. |
| 2015/0154538 A1 | 6/2015 | Skaaksrud et al. |
| 2015/0170099 A1 | 6/2015 | Beach-Drummond et al. |
| 2015/0348112 A1 | 12/2015 | Ramanujam |
| 2016/0018224 A1 | 1/2016 | Isler et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098871 A1 | 4/2016 | Oz et al. |
| 2016/0247109 A1 | 8/2016 | Scicluna et al. |
| 2016/0286627 A1 | 9/2016 | Chen et al. |
| 2016/0300187 A1 | 10/2016 | Kashi et al. |
| 2016/0334797 A1 | 11/2016 | Ross et al. |
| 2016/0357187 A1 | 12/2016 | Ansari |
| 2016/0357188 A1 | 12/2016 | Ansari et al. |
| 2016/0358477 A1 | 12/2016 | Ansari et al. |
| 2016/0363991 A1 | 12/2016 | Schlecht et al. |
| 2017/0011580 A1 | 1/2017 | Huang et al. |
| 2017/0057516 A1 | 3/2017 | Gordon et al. |
| 2017/0075355 A1 | 3/2017 | Micks et al. |
| 2017/0090480 A1 | 3/2017 | Ho et al. |
| 2017/0115125 A1 | 4/2017 | Outwater et al. |
| 2017/0124547 A1 | 5/2017 | Natarajan et al. |
| 2017/0124781 A1 | 5/2017 | Douillard et al. |
| 2017/0132934 A1 | 5/2017 | Kentley et al. |
| 2017/0132960 A1 | 5/2017 | Kis-Benedek Pinero et al. |
| 2017/0153714 A1 | 6/2017 | Gao et al. |
| 2017/0193434 A1 | 7/2017 | Shah et al. |
| 2017/0227962 A1 | 8/2017 | Cesarano et al. |
| 2017/0248964 A1 | 8/2017 | Kentley et al. |
| 2017/0255198 A1 | 9/2017 | Rodriguez et al. |
| 2017/0261977 A1* | 9/2017 | High ................ B64C 39/024 |
| 2017/0262790 A1 | 9/2017 | Khasis |
| 2017/0282859 A1* | 10/2017 | Grimm ............... H04L 9/0891 |
| 2017/0313421 A1* | 11/2017 | Gil ..................... B64D 1/00 |
| 2017/0323253 A1 | 11/2017 | Enssle et al. |
| 2018/0024554 A1* | 1/2018 | Brady ................ G05D 1/0088 |
| 2018/0025635 A1 | 1/2018 | Cheaz et al. |
| 2018/0033308 A1 | 2/2018 | Litkouhi et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1 | 3/2018 | Simms et al. |
| 2018/0082343 A1 | 3/2018 | Gordon et al. |
| 2018/0099602 A1 | 4/2018 | Salter et al. |
| 2018/0101818 A1 | 4/2018 | Simms et al. |
| 2018/0134200 A1 | 5/2018 | Wilkinson et al. |
| 2018/0144300 A1 | 5/2018 | Wiechers et al. |
| 2018/0157984 A1 | 6/2018 | O'Herlihy et al. |
| 2018/0158018 A1 | 6/2018 | Luckay et al. |
| 2018/0165728 A1 | 6/2018 | McDonald et al. |
| 2018/0189716 A1 | 7/2018 | Crone et al. |
| 2018/0194411 A1 | 7/2018 | Liivik et al. |
| 2018/0196416 A1 | 7/2018 | Iagnemma et al. |
| 2018/0196417 A1 | 7/2018 | Iagnemma et al. |
| 2018/0211541 A1 | 7/2018 | Rakah et al. |
| 2018/0232839 A1 | 8/2018 | Heinla et al. |
| 2018/0246526 A1 | 8/2018 | Wilkinson et al. |
| 2018/0253108 A1 | 9/2018 | Heinla et al. |
| 2018/0260778 A1 | 9/2018 | Mazetti et al. |
| 2018/0260780 A1 | 9/2018 | Mazetti et al. |
| 2018/0330313 A1 | 11/2018 | Clarke et al. |
| 2018/0349872 A1 | 12/2018 | Ahmed et al. |
| 2018/0373246 A1 | 12/2018 | Laughlin et al. |
| 2018/0374002 A1 | 12/2018 | Li et al. |
| 2019/0023236 A1 | 1/2019 | Webb et al. |

FOREIGN PATENT DOCUMENTS

| | | |
|---|---|---|
| JP | 2006177843 A | 7/2006 |
| WO | WO-2013025803 A1 | 2/2013 |
| WO | WO-2015160782 A1 | 10/2015 |
| WO | WO-2017014544 A1 | 1/2017 |
| WO | WO-2017064202 A1 | 4/2017 |
| WO | WO-2019018695 A1 | 1/2019 |
| WO | WO-2019023518 A1 | 1/2019 |
| WO | WO-2019023519 A1 | 1/2019 |
| WO | WO-2019023521 A1 | 1/2019 |
| WO | WO-2019023522 A1 | 1/2019 |
| WO | WO-2019023615 A1 | 1/2019 |
| WO | WO-2019023686 A1 | 1/2019 |

OTHER PUBLICATIONS

AN/TPS-43 Radar System Westinghouse. Westinghouse (pp. 3, 4, 6, 9 & 14) (14 pgs) (2007).
Chen et al. 3d object proposals for accurate object class detection. In Advances in Neural Information Processing Systems, pp. 424-432 (2015).
Chen et al. Monocular 3d object detection for autonomous driving. In Proceedings of the IEEE Conference on Computer Vision and Pattern Recognition, pp. 2147-2156 (2016).
Chen et al. Multi-view 3d object detection network for autonomous driving. In IEEE CVPR, pp. 1907-1915 (2017).
Co-pending U.S. Appl. No. 16/040,418, filed Jul. 19, 2018.
Co-pending U.S. Appl. No. 16/040,432, filed Jul. 19, 2018.
Co-pending U.S. Appl. No. 16/040,437, filed Jul. 19, 2018.
Co-pending U.S. Appl. No. 16/040,446, filed Jul. 19, 2018.
Co-pending U.S. Appl. No. 16/046,954, filed Jul. 26, 2018.
Co-pending U.S. Appl. No. 16/046,967, filed Jul. 26, 2018.
Co-pending U.S. Appl. No. 16/046,978, filed Jul. 26, 2018.
Co-pending U.S. Appl. No. 16/046,980, filed Jul. 26, 2018.
Co-pending U.S. Appl. No. 16/047,901, filed Jul. 27, 2018.
Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).
Engelcke et al. Vote3deep: Fast object detection in 3d point clouds using efficient convolutional neural networks. In Robotics and Automation (ICRA), 2017 IEEE International Conference on, pp. 1355-1361 (2017).
Food and Drugs Rule—Performance Standards for Light-Emitting Products 21 C.F.R. § 1040.10 (19 pgs) (2005).
Fox. vol. 6: Active Electro-Optical Systems. The Infrared & Electro-Optical Systems Handbook. (326 pgs) (1993).
Geiger et al. Vision meets robotics: the KITTI dataset. The International Journal of Robotics Research 32(11):1231-1237 (2013).
Girshick et al. Rich feature hierarchies for accurate object detection and semantic segmentation. In Computer Vision and Pattern Recognition (CVPR) 2014 IEEE Conference on, pp. 580-587 (2014).
Gustavson. Diode-laser radar for low cost weapon guidance. SPIE 1633(VII):21-32 (pp. 21, 27, 28, 31 & Fig. 3.3-1) (1992).
Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).
Kilpela. Precise pulsed time-of-flight laser range finder for industrial distance measurements. Review of Scientific Instruments 72:2197 (Apr. 2001).

(56) References Cited

OTHER PUBLICATIONS

Lahoud et al. 2d-driven 3d object detection in rgb-d images. In Proceedings of the IEEE Conference on Computer Vision and Pattern Recognition, pp. 4622-4630 (2017).
Liu et al. SSD: Single shot multibox detector. In European conference on computer vision, pp. 21-37. Springer (2016).
Maturana et al. Voxnet: A 3d convolutional neural network for real-time object recognition. In IEEE/RSJ International Conference on Intelligent Robots and Systems (7 pgs) (Sep. 2015).
Mousavian et al. 3d bounding box estimation using deep learning and geometry. In Computer Vision and Pattern Recognition (CVPR), pp. 7074-7082 (2016).
Qi et al. Pointnet++: Deep hierarchical feature learning on point sets in a metric space. NIPS (14 pgs) (2017).
Qi et al. Frustum PointNets for 3D Object Detection from RGB-D Data. In Computer Vision and Pattern Recognition (CVPR), pp. 918-927 (Apr. 2018).
Qi et al. Pointnet: Deep learning on point sets for 3d classification and segmentation. Proc. Computer Vision and Pattern Recognition (CVPR), pp. 652-660 (2017).
Qi et al. Volumetric and multi-view cnns for object classification on 3d data. In Proceedings Computer Vision and Pattern Recognition (CVPR), pp. 5648-5656 (2016).
Ren et al. Accurate single stage detector using recurrent rolling convolution. In Computer Vision and Pattern Recognition (CVPR), pp. 5420-5428 (2017).
Ren et al. Faster r-cnn: Towards real-time object detection with region proposal networks. In Advances in neural information processing systems, pp. 91-99 (2015).
Ren et al. Three-dimensional object detection and layout prediction using clouds of oriented gradients. In Proceedings of the IEEE Conference on Computer Vision and Pattern Recognition, pp. 1525-1533 (2016).
Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1 2005).
Riegler et al. Octnet: Learning deep 3d representations at high resolutions. In Computer Vision and Pattern Recognition (CVPR), pp. 3577-3586 (2016).
Skolnik. Introduction to Radar Systems Handbook. McGraw-Hill Book Company. (590 pgs)(2d ed. 1980).
Skolnik. Radar Handbook. McGraw-Hill Book Company (1.18, 20.6 & 20.7-8) (846 pgs)(2d ed. 1990).
Song et al. Deep sliding shapes for amodal 3d object detection in rgb-d images. In Proceedings of the IEEE Conference on Computer Vision and Pattern Recognition, pp. 808-816 (2016).
Song et al. Sliding shapes for 3d object detection in depth images. In Computer Vision-ECCV 2014, pp. 634-651 (2014).
Song et al. Sun rgb-d: A rgb-d scene understanding benchmark suite. In Proceedings of the IEEE Conference on Computer Vision and Pattern Recognition, pp. 567-576 (2015).
Su et al. Multi-view convolutional neural networks for 3d shape recognition. In Proceedings of the IEEE Conference on Computer Vision and Pattern Recognition, pp. 945-953 (2015).
Wang et al. O-cnn: Octree-based convolutional neural networks for 3d shape analysis. ACM Transactions on Graphics (TOG) 36(4):72 (2017).
Wu et al. 3d shapenets: A deep representation for volumetric shapes. In Proceedings of the IEEE Conference on Computer Vision and Pattern Recognition, pp. 1912-1920 (2015).
Xiang et al. Data-driven 3d voxel patterns for object category recognition. In Proceedings of the IEEE Conference on Computer Vision and Pattern Recognition, pp. 1903-1911 (2015).
Yu et al. Vehicle detection and localization on birds eye view elevation images using convolutional neural network. 2017 IEEE International Symposium on Safety, Security and Rescue Robotics (SSRR) INSPEC Accession No. 17315970 (2017).
Qi et al. Frustum PointNets for 3D Object Detection from RGB-D Data. Available from https://arxiv.org/pdf/1711.08488v1.pdf (15 pgs.) (Nov. 2017).
PCT/US2018/042967 International Search Report and Written Opinion dated Sep. 26, 2018.
PCT/US2018/043987 International Search Report and Written Opinion dated Oct. 2, 2018.
PCT/US2018/043989 International Search Report and Written Opinion dated Oct. 5, 2018.
PCT/US2018/043990 International Search Report and Written Opinion dated Oct. 5, 2018.
U.S. Appl. No. 16/040,446 Office Action dated Oct. 17, 2018.
U.S. Appl. No. 16/046,967 Office Action dated Dec. 4, 2018.
U.S. Appl. No. 16/047,901 Office Action dated Dec. 11, 2018.
Co-pending U.S. Appl. No. 16/119,939, filed Aug. 31, 2018.
Emerging Tech. Domino's has built a self-driving pizza delivery robot. Available at https://www.digitaltrends.com/cool-tech/dominos-pizza-delivery-robot/ (12 pgs) (2016).
Olson. Self-Driving Robots Will Start Delivering Food for Just Eat and Others. Available at https://www.forbes.com/sites/parmyolson/2016/07/05/self-driving-robots-food-delivery-just-eat/#6e3e834b280d (3 pgs) (2016).
PCT/US2018/043986 International Search Report and Written Opinion dated Oct. 23, 2018.
PCT/US2018/044155 International Search Report and Written Opinion dated Oct. 15, 2018.
PCT/US2018/044248 International Search Report and Written Opinion dated Oct. 24, 2018.
Pettitt. Forget delivery drones, meet your new delivery robot. Available at https://www.cnbc.com/2015/11/02/forget-delivery-drones-meet-your-new-delivery-robot.html (5 pgs) (2015).
U.S. Appl. No. 16/046,954 Office Action dated Nov. 29, 2018.
Westaway. Meet the robot built to deliver your shopping. Starship Technologies' "local delivery robot" is semi-autonomous, covered in cameras and ready to bring food to your door. Available at https://www.cnet.com/news/meet-the-robot-thats-built-to-deliver-your-shopping/ (4 pgs.) (2016).
Curtis et al., Skype founders invent self-driving robot that can deliver groceries for L1. London Telegraph (3 pgs) (2015).
Navarro et al. A mobile robot vending machine for beaches based on customer's preferences and multivariate methods. Procedia—Social and Behavioral Sciences 175:122-129 (2015).
Peters. The Grocery Store, of the Future is Mobile, Self-Driving and Run by AI. Fast Company (6 pgs.) (Jun. 13, 2017).
Ratkov. Robotic Vending Machines Anthonyratkkov.com/robotics/robotic vending machines (2 pgs.) (2010).
U.S. Appl. No. 16/046,978 Office Action dated Feb. 28, 2019.
U.S. Appl. No. 16/046,980 Office Action dated Feb. 27, 2019.
U.S. Appl. No. 16/046,967 Office Action dated Mar. 28, 2019.
U.S. Appl. No. 16/047,901 Office Action dated Mar. 28, 2019.

* cited by examiner

METHODS FOR INTERACTING WITH AUTONOMOUS OR SEMI-AUTONOMOUS VEHICLE

CROSS REFERENCE

This application claims priority to U.S. Provisional Application No. 62/538,538, filed on Jul. 28, 2017, the contents of which are incorporated herein by reference in its entirety.

BACKGROUND OF THE INVENTION

The field of autonomous and semi-autonomous vehicles is a growing field of innovation. Vehicles are being used for many purposes including warehouse inventory operations, household operations, hospital deliveries, sanitation, and military or defense applications.

SUMMARY OF THE INVENTION

This disclosure relates to an autonomous and/or semi-autonomous vehicle fleet comprising a plurality of vehicles, in particular vehicles for transporting or retrieving deliveries in either unstructured outdoor environment or closed environments.

One aspect provided herein is a system for direct fulfillment of an order to a customer, the system comprising: an autonomous or semi-autonomous vehicle comprising: a compartment having a compartment door, wherein the compartment is configured to secure an item associated with the order; a compartment actuator configured to open and close the compartment door; an autonomous or semi-autonomous propulsion system; and one or more sensors configured to measure: a specific area data corresponding to a customer address associated with the order; and a compartment status of the compartment; the system further comprising a processor configured to provide a fulfillment application comprising: a communication module receiving at least one of the specific area data and the compartment status; a navigation module directing the autonomous or semi-autonomous propulsion system of the autonomous or semi-autonomous vehicle to the customer address; and a compartment door control module selecting and implementing a compartment door instruction, wherein the compartment door instruction comprises an open compartment door instruction or a close compartment door instruction based on the compartment status; and a mobile processor associated with the customer and configured to provide a customer application.

In some embodiments, the fulfillment application further comprises a direct delivery module applying an object recognition algorithm to determine a primary entrance location based on the specific area data, and wherein the navigation module further directs the vehicle from the customer address to the primary entrance location. In some embodiments, the one or more sensors comprise a RADAR, a LiDAR, a camera, a video camera, a proximity sensor, a contact sensor, a light sensor, an infrared sensor, a switch, or any combination thereof. In some embodiments, the specific area data comprises a three-dimensional spatial data. In some embodiments, the primary entrance location comprises at least one of a door, an entranceway, a pathway, a garage door, a gate, an atrium, a foyer, a gateway, and a driveway. In some embodiments, the customer application comprises a primary entrance selection module receiving the primary entrance location from the customer, wherein the customer submits the primary entrance location to the primary entrance selection module by selecting a pinpoint location on a map, and wherein the fulfillment application further comprises a customer preference database module storing the pinpoint location. In some embodiments, the map comprises a satellite image map. In some embodiments, the fulfillment application further comprises a photo module receiving an image of the customer, wherein the one or more sensors are further configured to measure a facial feature of the order recipient, and wherein the communication module further receives the facial feature, wherein the fulfillment application further comprises a facial recognition module applying a facial recognition algorithm to the facial feature of the order recipient and the image of the customer to confirm that the order recipient corresponds to the customer, wherein the compartment door control module selects and implements the compartment door instruction based on the confirmation, and wherein the customer application comprises a customer image input module capturing the image of the customer, transmitting the image of the customer to the photo module, and saving the image of the customer. In some embodiments, the image of the customer comprises a photograph of the customer, a photograph of an identification card associated with the customer, or both. In some embodiments, the fulfillment application further comprises a live identification card authentication module capturing a live image of an identification card of the order recipient, applying an identification card and text recognition algorithm to confirm that the identification card of the order recipient corresponds to the customer. In some embodiments, the communication module further receives an access authentication, and wherein the compartment door control module further or alternatively directs the compartment actuator to open the compartment door based on the access authentication. In some embodiments, the autonomous or semi-autonomous vehicle further comprises a customer interface configured to receive a passcode and transmit the access authentication to the communication module based on the passcode. In some embodiments, the fulfillment application further comprises a passcode module generating the passcode, submitting the passcode to the customer, and authenticating the received password. In some embodiments, the customer interface comprises a button, a touchscreen, or both. In some embodiments, the customer application comprises a compartment activation module receiving a compartment activation request from the customer, an administrator, or both to open or close the compartment door, and transmitting the compartment activation request to the compartment door control module based on the compartment activation request. In some embodiments, the compartment activation module further receives a current location of the customer and a current location of the vehicle, and wherein the control module directs the compartment actuator to open the compartment door based on the compartment activation request only when the current location of the customer is within a set proximity distance from the current location of the vehicle. In some embodiments, each vehicle further comprises a vehicle identification module configured to direct a vehicle indicator aboard the vehicle to emit a vehicle identification media, wherein the fulfillment application further comprises an indicator activation module transmitting an indicator activation instruction to the vehicle identification module, and wherein the indicator activation instruction comprises an identification pattern, wherein the identification pattern is associated with the order, the customer, the vehicle, or any combination thereof, wherein the vehicle identification media comprises the identification pattern, and wherein the customer application comprises an identification pattern display module receiving the identification pattern and displaying the identification pattern to the customer. In some embodiments, the vehicle indicator comprises a light, a display screen, a speaker, a car horn, or any combination thereof. In some embodiments, the indicator activation module transmits the indicator initiation instruction to the vehicle indicator when the autonomous or semi-autonomous vehicle is within a set indication distance from the customer address. In some embodiments, the customer application comprises an indicator activation module receiving an indicator activation request from the customer and transmitting the indicator activation request to the indicator activation module, wherein the indicator instruction further comprises the indicator activation request. In some embodiments, the customer application comprises a current vehicle position indication module displaying a current position of the vehicle, an estimated time of arrival, or both to the customer, and wherein the current vehicle position indication module only displays the current position of the vehicle when the current position is within a set position display distance from the customer address or within a set position display time from the customer address. In some embodiments, the compartment status comprises at least one of an opened compartment status, a closed compartment status, an object blocking compartment status, a customer blocking compartment status an unblocked compartment status, and wherein the compartment door control module selects and implements the closed compartment door instruction when the compartment status comprises the opened compartment status, the unblocked compartment status, or both. In some embodiments, the compartment door control module further selects and implements a pause compartment door instruction for a set waiting time period if the compartment status comprises the blocked compartment status, wherein the compartment door control module further selects and implements the pause compartment door instruction if the compartment status comprises the blocked compartment status while the compartment door is being closed, and wherein the compartment door control module further selects and implements the close compartment door instruction once the compartment status comprises the unblocked compartment status. In some embodiments, the compartment status further comprises an absent customer status, and wherein the compartment door control module selects and implements the close compartment door instruction when the compartment status comprises the absent customer status, and wherein the compartment door control module select and implements the close compartment door instruction when the compartment status comprises the absent customer status for a set period of absence. In some embodiments, the compartment door control module only opens the compartment door when the vehicle is at a complete stop, arrives at the customer address or the primary entrance location, or both. In some embodiments, the compartment door control module further receives an administrator control command from an administrator, and wherein the compartment door control module further directs the compartment actuator to close the compartment door, open the compartment door, or both based on the administrator control command. In some embodiments, the autonomous or semi-autonomous vehicle further comprises a compartment interface configured to receive the compartment door instruction, confirm the compartment door instruction, or both. In some embodiments, the compartment interface comprises a button, a Wi-Fi device, a Bluetooth device, a camera, a cellular device, a satellite device, or any combination thereof, wherein the compartment interface is configured to receive the compartment door instruction from an administrator, the customer, or both, and wherein the compartment interface is further configured to send the compartment status to the compartment door control module based on the compartment door instruction. In some embodiments, the compartment interface is configured to receive the compartment door instruction the customer via an SMS text message. In some embodiments, the customer application comprises a compartment door module configured to receive the compartment door instruction and transmit the compartment door instruction to the compartment interface. In some embodiments, the compartment further comprises an item removal sensor configured to detect removal of the item from the compartment. In some embodiments, at least one of the object recognition algorithm and the facial recognition algorithm comprises a machine learning algorithm, a rule-based algorithm, or both.

One aspect provided herein is a system for direct fulfillment of an order to a customer, the system comprising: an autonomous or semi-autonomous vehicle comprising: a compartment having a compartment door, wherein the compartment is configured to secure an item associated with the order; a compartment actuator configured to open and close the compartment door; an autonomous or semi-autonomous propulsion system; and one or more sensors configured to measure: a specific area data corresponding to a customer address associated with the order; and a compartment status of the compartment; the system further comprising a processor configured to provide a fulfillment application comprising: a communication module receiving at least one of the specific area data and the compartment status; a direct delivery module applying an object recognition algorithm to determine a primary entrance location based on the specific area data; a navigation module directing the autonomous or semi-autonomous propulsion system of the autonomous or semi-autonomous vehicle from the customer address to the primary entrance location; and a compartment door control module selecting and implementing a compartment door instruction, wherein the compartment door instruction comprises an open compartment door instruction or a close compartment door instruction based on the compartment status; and a mobile processor associated with the customer and configured to provide a customer application.

In some embodiments, the one or more sensors comprise a RADAR, a LiDAR, a camera, a video camera, a proximity sensor, a contact sensor, a light sensor, an infrared sensor, a switch, or any combination thereof. In some embodiments, the specific area data comprises a three-dimensional spatial data. In some embodiments, the primary entrance location comprises at least one of a door, an entranceway, a pathway, a garage door, a gate, an atrium, a foyer, a gateway, and a driveway. In some embodiments, the customer application comprises a primary entrance selection module receiving the primary entrance location from the customer, wherein the customer submits the primary entrance location to the primary entrance selection module by selecting a pinpoint location on a map, and wherein the fulfillment application further comprises a customer preference database module storing the pinpoint location. In some embodiments, the map comprises a satellite image map. In some embodiments, the fulfillment application further comprises a photo module receiving an image of the customer, wherein the one or more sensors are further configured to measure a facial feature of the order recipient, and wherein the communication module further receives the facial feature, wherein the fulfillment application further comprises a facial recognition module applying a facial recognition algorithm to the facial feature of the order recipient and the image of the customer to confirm that the order recipient corresponds to the customer, wherein the compartment door control module selects and implements the compartment door instruction based on the confirmation, and wherein the customer application comprises a customer image input module capturing the image of the customer, transmitting the image of the customer to the photo module, and saving the image of the customer. In some embodiments, the image of the customer comprises a photograph of the customer, a photograph of an identification card associated with the customer, or both. In some embodiments, the fulfillment application further comprises a live identification card authentication module capturing a live image of an identification card of the order recipient, applying an identification card and text recognition algorithm to confirm that the identification card of the order recipient corresponds to the customer. In some embodiments, the communication module further receives an access authentication, and wherein the compartment door control module further or alternatively directs the compartment actuator to open the compartment door based on the access authentication. In some embodiments, the autonomous or semi-autonomous vehicle further comprises a customer interface configured to receive a passcode and transmit the access authentication to the communication module based on the passcode. In some embodiments, the fulfillment application further comprises a passcode module generating the passcode, submitting the passcode to the customer, and authenticating the received password. In some embodiments, the customer interface comprises a button, a touchscreen, or both. In some embodiments, the customer application comprises a compartment activation module receiving a compartment activation request from the customer, an administrator, or both to open or close the compartment door, and transmitting the compartment activation request to the compartment door control module based on the compartment activation request. In some embodiments, the compartment activation module further receives a current location of the customer and a current location of the vehicle, and wherein the control module directs the compartment actuator to open the compartment door based on the compartment activation request only when the current location of the customer is within a set proximity distance from the current location of the vehicle. In some embodiments, each vehicle further comprises a vehicle identification module configured to direct a vehicle indicator aboard the vehicle to emit a vehicle identification media, wherein the fulfillment application further comprises an indicator activation module transmitting an indicator activation instruction to the vehicle identification module, and wherein the indicator activation instruction comprises an identification pattern, wherein the identification pattern is associated with the order, the customer, the vehicle, or any combination thereof, wherein the vehicle identification media comprises the identification pattern, and wherein the customer application comprises an identification pattern display module receiving the identification pattern and displaying the identification pattern to the customer. In some embodiments, the vehicle indicator comprises a light, a display screen, a speaker, a car horn, or any combination thereof. In some embodiments, the indicator activation module transmits the indicator initiation instruction to the vehicle indicator when the autonomous or semi-autonomous vehicle is within a set indication distance from the customer address. In some embodiments, the customer application comprises an indicator activation module receiving an indicator activation request from the customer and transmitting the indicator activation request to the indicator activation module, wherein the indicator instruction further comprises the indicator activation request. In some embodiments, the customer application comprises a current vehicle position indication module displaying a current position of the vehicle, an estimated time of arrival, or both to the customer, and wherein the current vehicle position indication module only displays the current position of the vehicle when the current position is within a set position display distance from the customer address or within a set position display time from the customer address. In some embodiments, the compartment status comprises at least one of an opened compartment status, a closed compartment status, an object blocking compartment status, a customer blocking compartment status an unblocked compartment status, and wherein the compartment door control module selects and implements the closed compartment door instruction when the compartment status comprises the opened compartment status, the unblocked compartment status, or both. In some embodiments, the compartment door control module further selects and implements a pause compartment door instruction for a set waiting time period if the compartment status comprises the blocked compartment status, wherein the compartment door control module further selects and implements the pause compartment door instruction if the compartment status comprises the blocked compartment status while the compartment door is being closed, and wherein the compartment door control module further selects and implements the close compartment door instruction once the compartment status comprises the unblocked compartment status. In some embodiments, the compartment status further comprises an absent customer status, and wherein the compartment door control module selects and implements the close compartment door instruction when the compartment status comprises the absent customer status, and wherein the compartment door control module select and implements the close compartment door instruction when the compartment status comprises the absent customer status for a set period of absence. In some embodiments, the compartment door control module only opens the compartment door when the vehicle is at a complete stop, arrives at the customer address or the primary entrance location, or both. In some embodiments, the compartment door control module further receives an administrator control command from an administrator, and wherein the compartment door control module further directs the compartment actuator to close the compartment door, open the compartment door, or both based on the administrator control command. In some embodiments, the autonomous or semi-autonomous vehicle further comprises a compartment interface configured to receive the compartment door instruction, confirm the compartment door instruction, or both. In some embodiments, the compartment interface comprises a button, a Wi-Fi device, a Bluetooth device, a camera, a cellular device, a satellite device, or any combination thereof, wherein the compartment interface is configured to receive the compartment door instruction from an administrator, the customer, or both, and wherein the compartment interface is further configured to send the compartment status to the compartment door control module based on the compartment door instruction. In some embodiments, the compartment interface is configured to receive the compartment door instruction the customer via an SMS text message. In some embodiments, the customer application comprises a compartment door module configured to receive the compartment door instruction and transmit the compartment door instruction to the compartment interface. In some embodiments, the compartment further comprises an item removal sensor configured to detect removal of the item from the compartment. In some embodiments, at least one of the object recognition algorithm and the facial recognition algorithm comprises a machine learning algorithm, a rule-based algorithm, or both.

Another aspect provided herein is a method for direct fulfillment of an order to a customer, the system comprising: providing an autonomous or semi-autonomous vehicle comprising: a compartment having a compartment door, wherein the compartment is configured to secure an item associated with the order; a compartment actuator configured to open and close the compartment door; an autonomous or semi-autonomous propulsion system; and one or more sensors configured to measure: a specific area data corresponding to a customer address associated with the order; and a compartment status of the compartment; receiving, by a communication module, at least one of the specific area data and the compartment status; applying, by a direct delivery module, an object recognition algorithm to determine a primary entrance location based on the specific area data; directing, by a navigation module, the autonomous or semi-autonomous propulsion system of the autonomous or semi-autonomous vehicle from the customer address to the primary entrance location; and selecting and implementing, by a compartment door control module, a compartment door instruction, wherein the compartment door instruction comprises an open compartment door instruction or a close compartment door instruction based on the compartment status.

In some embodiments, the one or more sensors comprise a RADAR, a LiDAR, a camera, a video camera, a proximity sensor, a contact sensor, a light sensor, an infrared sensor, a switch, or any combination thereof. In some embodiments, the specific area data comprises a three-dimensional spatial data. In some embodiments, the primary entrance location comprises at least one of a door, an entranceway, a pathway, a garage door, a gate, an atrium, a foyer, a gateway, and a driveway. In some embodiments, the customer application comprises a primary entrance selection module receiving the primary entrance location from the customer, wherein the customer submits the primary entrance location to the primary entrance selection module by selecting a pinpoint location on a map, and wherein the fulfillment application further comprises a customer preference database module storing the pinpoint location. In some embodiments, the map comprises a satellite image map. In some embodiments, the fulfillment application further comprises a photo module receiving an image of the customer, wherein the one or more sensors are further configured to measure a facial feature of the order recipient, and wherein the communication module further receives the facial feature, wherein the fulfillment application further comprises a facial recognition module applying a facial recognition algorithm to the facial feature of the order recipient and the image of the customer to confirm that the order recipient corresponds to the customer, wherein the compartment door control module selects and implements the compartment door instruction based on the confirmation, and wherein the customer application comprises a customer image input module capturing the image of the customer, transmitting the image of the customer to the photo module, and saving the image of the customer. In some embodiments, the image of the customer comprises a photograph of the customer, a photograph of an identification card associated with the customer, or both. In some embodiments, the fulfillment application further comprises a live identification card authentication module capturing a live image of an identification card of the order recipient, applying an identification card and text recognition algorithm to confirm that the identification card of the order recipient corresponds to the customer. In some embodiments, the communication module further receives an access authentication, and wherein the compartment door control module further or alternatively directs the compartment actuator to open the compartment door based on the access authentication. In some embodiments, the autonomous or semi-autonomous vehicle further comprises a customer interface configured to receive a passcode and transmit the access authentication to the communication module based on the passcode. In some embodiments, the fulfillment application further comprises a passcode module generating the passcode, submitting the passcode to the customer, and authenticating the received password. In some embodiments, the customer interface comprises a button, a touchscreen, or both. In some embodiments, the customer application comprises a compartment activation module receiving a compartment activation request from the customer, an administrator, or both to open or close the compartment door, and transmitting the compartment activation request to the compartment door control module based on the compartment activation request. In some embodiments, the compartment activation module further receives a current location of the customer and a current location of the vehicle, and wherein the control module directs the compartment actuator to open the compartment door based on the compartment activation request only when the current location of the customer is within a set proximity distance from the current location of the vehicle. In some embodiments, each vehicle further comprises a vehicle identification module configured to direct a vehicle indicator aboard the vehicle to emit a vehicle identification media, wherein the fulfillment application further comprises an indicator activation module transmitting an indicator activation instruction to the vehicle identification module, and wherein the indicator activation instruction comprises an identification pattern, wherein the identification pattern is associated with the order, the customer, the vehicle, or any combination thereof, wherein the vehicle identification media comprises the identification pattern, and wherein the customer application comprises an identification pattern display module receiving the identification pattern and displaying the identification pattern to the customer. In some embodiments, the vehicle indicator comprises a light, a display screen, a speaker, a car horn, or any combination thereof. In some embodiments, the indicator activation module transmits the indicator initiation instruction to the vehicle indicator when the autonomous or semi-autonomous vehicle is within a set indication distance from the customer address. In some embodiments, the customer application comprises an indicator activation module receiving an indicator activation request from the customer and transmitting the indicator activation request to the indicator activation module, wherein the indicator instruction further comprises the indicator activation request. In some embodiments, the customer application comprises a current vehicle position indication module displaying a current position of the vehicle, an estimated time of arrival, or both to the customer, and wherein the current vehicle position indication module only displays the current position of the vehicle when the current position is within a set position display distance from the customer address or within a set position display time from the customer address. In some embodiments, the compartment status comprises at least one of an opened compartment status, a closed compartment status, an object blocking compartment status, a customer blocking compartment status an unblocked compartment status, and wherein the compartment door control module selects and implements the closed compartment door instruction when the compartment status comprises the opened compartment status, the unblocked compartment status, or both. In some embodiments, the compartment door control module further selects and implements a pause compartment door instruction for a set waiting time period if the compartment status comprises the blocked compartment status, wherein the compartment door control module further selects and implements the pause compartment door instruction if the compartment status comprises the blocked compartment status while the compartment door is being closed, and wherein the compartment door control module further selects and implements the close compartment door instruction once the compartment status comprises the unblocked compartment status. In some embodiments, the compartment status further comprises an absent customer status, and wherein the compartment door control module selects and implements the close compartment door instruction when the compartment status comprises the absent customer status, and wherein the compartment door control module select and implements the close compartment door instruction when the compartment status comprises the absent customer status for a set period of absence. In some embodiments, the compartment door control module only opens the compartment door when the vehicle is at a complete stop, arrives at the customer address or the primary entrance location, or both. In some embodiments, the compartment door control module further receives an administrator control command from an administrator, and wherein the compartment door control module further directs the compartment actuator to close the compartment door, open the compartment door, or both based on the administrator control command. In some embodiments, the autonomous or semi-autonomous vehicle further comprises a compartment interface configured to receive the compartment door instruction, confirm the compartment door instruction, or both. In some embodiments, the compartment interface comprises a button, a Wi-Fi device, a Bluetooth device, a camera, a cellular device, a satellite device, or any combination thereof, wherein the compartment interface is configured to receive the compartment door instruction from an administrator, the customer, or both, and wherein the compartment interface is further configured to send the compartment status to the compartment door control module based on the compartment door instruction. In some embodiments, the compartment interface is configured to receive the compartment door instruction the customer via an SMS text message. In some embodiments, the customer application comprises a compartment door module configured to receive the compartment door instruction and transmit the compartment door instruction to the compartment interface. In some embodiments, the compartment further comprises an item removal sensor configured to detect removal of the item from the compartment. In some embodiments, at least one of the object recognition algorithm and the facial recognition algorithm comprises a machine learning algorithm, a rule-based algorithm, or both.

Another aspect provided herein is a platform for accurate tracking and delivering of an item to a customer by an autonomous or semi-autonomous vehicle having a media device, the platform comprising: a server processor configured to provide a server application comprising: an order module receiving a delivery order of the item by the customer, wherein the delivery order comprises a current customer location consisting of a customer GPS coordinate; a navigation module directing the autonomous or semi-autonomous vehicle to the customer location via a route based on the customer GPS coordinate, wherein at least a portion of the route is off-road; an autonomous or semi-autonomous vehicle processor aboard the autonomous or semi-autonomous vehicle configured to provide a vehicle application comprising: a locational module sending a vehicle GPS coordinate of the autonomous or semi-autonomous vehicle to the server processor; and an indication module emitting a visual or auditory media via the media device, wherein the visual or auditory media is based on the delivery order; and a mobile processor configured to provide a mobile application comprising: a status module displaying at least one of the route, the vehicle GPS coordinate, the customer GPS coordinate, and the visual or auditory media.

In some embodiments, the portion of the route that is off-road comprises a sidewalk, a walkway, a trail, a path, a footbridge, a courtyard, a field, a corridor, a commons, or a yard. In some embodiments, the media device comprises a screen, a speaker, a light, a sign, or any combination thereof. In some embodiments, the autonomous or semi-autonomous vehicle further comprises a communication device. In some embodiments, the navigation module directs the autonomous or semi-autonomous vehicle via the communication device. In some embodiments, the locational module sends the vehicle GPS coordinate via the communication device. In some embodiments, the autonomous or semi-autonomous vehicle further comprises a sensor device configured to collect a sensor data. In some embodiments, the vehicle application further comprises an obstacle avoidance module, preventing damage to steer the autonomous or semi-autonomous vehicle based at least on the sensor data. In some embodiments, the autonomous or semi-autonomous vehicle further comprises a compartment configured to contain and secure the item. In some embodiments, the vehicle application further comprises a compartment module automatically opening the compartment, closing the compartment, or both based on the sensor data. In some embodiments, the visual or auditory media comprises a sign, a screen, a sound, a light pattern, a light color, or any combination thereof. In some embodiments, the visual or auditory media is further based on the item. In some embodiments, the mobile application further comprises a position updating module receiving an updated location of the customer. In some embodiments, the navigation module further receives the updated location and modifies the route based on the updated location.

Another aspect provided herein is a vehicle fleet comprising a plurality of autonomous or semi-autonomous vehicles operating autonomously and/or semi-autonomously and a fleet management module, associated with a central server for coordination of the autonomous or semi-autonomous vehicle fleet; the fleet management module configured to coordinate the activity and positioning of each autonomous or semi-autonomous vehicle in the fleet, wherein the fleet is configured for transporting, delivering or retrieving goods or services and capable of operating in an unstructured open or closed environments; each autonomous or semi-autonomous vehicle in the fleet comprising: a power system, a conveyance system; (e.g., a drive system with a propulsion engine, wheels, treads, wings, rotors, blowers, rockets, propellers, brakes, etc.); a navigation module for navigation in the unstructured open or closed environments; (e.g., digital maps, HD maps, GPS); a communication module configurable to receive, store and send data to the fleet management module, a user, and the autonomous or semi-autonomous vehicles in the fleet, related to at least; user interactions and the autonomous or semi-autonomous vehicle fleet interactions, comprising: scheduled requests or orders, on-demand requests or orders, or a need for self-positioning of the autonomous or semi-autonomous vehicle fleet based on anticipated demand within the unstructured open or closed environments; a sensor system, at least one securable compartment or a plurality of securable compartments to hold said goods or items associated with said services; and a controller configurable to associate each one of the at least one or plurality of securable compartments to an assignable customer, or customer group in a marketplace, or provider and provide entry when authorized; at least one processor configured to manage the conveyance system, the navigation module, the sensor system, instructions from the fleet management module, the communication module, and the controller.

In some embodiments, the unstructured open environment is a non-confined geographic region accessible by navigable pathways comprising: public roads; private roads; bike paths; open fields; open public lands; open private lands; pedestrian walkways; lakes; rivers; streams; or open airspace.

In some embodiments, the closed environment is a confined, enclosed or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the navigation module controls routing of the conveyance system of the autonomous or semi-autonomous vehicles in the fleet in the unstructured open or closed environments.

In some embodiments, the communication to the user, to the autonomous or semi-autonomous vehicles in the fleet, between the autonomous or semi-autonomous vehicles of the fleet, and between the user and the autonomous or semi-autonomous vehicles in the fleet, occurs via wireless transmission.

In some embodiments, the user comprises a fleet manager; a sub-contracting vendor; a service provider; a customer; a business entity; an individual; or a third party.

In some embodiments, the user's wireless transmission interactions and the autonomous or semi-autonomous vehicle fleet wireless transmission interactions occur via mobile application transmitted by an electronic device and forwarded to the communication module via: a central server; a fleet management module; and/or a mesh network.

In some embodiments, the electronic device comprises: a phone; a personal mobile device; a personal digital assistant (PDA); a mainframe computer; a desktop computer; a laptop computer; a tablet computer; and/or wearable computing device comprising: a communication headset; smart glasses; a contact lens or lenses; a digital watch; a bracelet; a ring; jewelry; or a combination thereof.

In some embodiments, each autonomous or semi-autonomous vehicle fleet is configured with a maximum speed range from 1.0 mph to 90.0 mph.

In some embodiments, the plurality of securable compartments are humidity and temperature controlled for: hot goods, cold goods, wet goods, dry goods, or combinations or variants thereof.

In some embodiments, the plurality of securable compartments are configurable for a plurality of goods. Such configurations and goods comprise: bookshelves for books; thin drawers for documents; larger box-like drawers for packages, and sized compartments for vending machines, coffee makers, pizza ovens and dispensers.

In some embodiments, the plurality of securable compartments are variably configurable based on: anticipated demands; patterns of behaviors; area of service; or types of goods to be transported.

In some embodiments, the services comprise: subscription services; prescription services; marketing services; advertising services; notification services; a mobile marketplace; or requested, ordered or scheduled delivery services. In particular embodiments, the scheduled delivery services include, by way of example, special repeat deliveries such as groceries, prescriptions, drinks, mail, documents, etc.

In some embodiments, the services further comprise: the user receiving and returning the same or similar goods within the same interaction; (e.g., signed documents); the user receiving one set of goods and returning a different set of goods within the same interaction; (e.g., product replacement/returns, groceries, merchandise, books, recording, videos, movies, payment transactions, etc.); a third party user providing instruction and or authorization to a goods or service provider to prepare, transport, deliver and/or retrieve goods to a principle user in a different location.

In some embodiments, the services further comprise: general services, (e.g., picking up a user's dry cleaning, dropping off a user's dry cleaning, renting goods, (such as tools, DVDs, etc.), sharing/borrowing goods from other users or businesses, etc.). Further still, it may be a general pickup service for items to be shipped, returned, or sent to other users/businesses, etc.

In some embodiments, at least one autonomous or semi-autonomous vehicle in the fleet is further configured to process or manufacture goods.

In some embodiments, the processed or manufactured goods comprise: beverages, etc., with or without condiments; (e.g., coffee, tea, carbonated drinks, etc.); a plurality of fast foods; or microwavable foods.

In some embodiments, the autonomous or semi-autonomous vehicle fleet further comprises at least one autonomous or semi-autonomous vehicle having a digital display for curated content comprising: advertisements (i.e., for both specific user and general public), including; services provided, marketing/promotion, regional/location of areas served, customer details, local environment, lost, sought or detected people, public service announcements, date, time, or weather.

In some embodiments of the autonomous or semi-autonomous vehicle fleet, the positioning of autonomous or semi-autonomous vehicles can be customized based on: anticipated use, a pattern of historical behaviors, or specific goods being carried.

In some embodiments, the autonomous or semi-autonomous vehicle fleet is fully-autonomous.

In some embodiments, the autonomous or semi-autonomous vehicle fleet is semi-autonomous.

In some embodiments, the autonomous or semi-autonomous vehicle fleet is controlled directly by the user.

In some embodiments of the autonomous or semi-autonomous vehicle fleet, a plurality of said autonomous or semi-autonomous vehicles within the fleet is operated on behalf of third party vendor/service provider; (e.g., fleet managed by an owner, but providing a coffee service/experience for a third party vendor (i.e., Starbucks) with white label vehicles in the fleet).

In some embodiments of the autonomous or semi-autonomous vehicle fleet, a plurality of said autonomous or semi-autonomous vehicles within the fleet is further configured to be part of a sub-fleet comprising a sub-plurality of autonomous or semi-autonomous vehicles, wherein each sub-fleet is configured to operate independently or in tandem with multiple sub-fleets comprising two or more sub-fleets.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
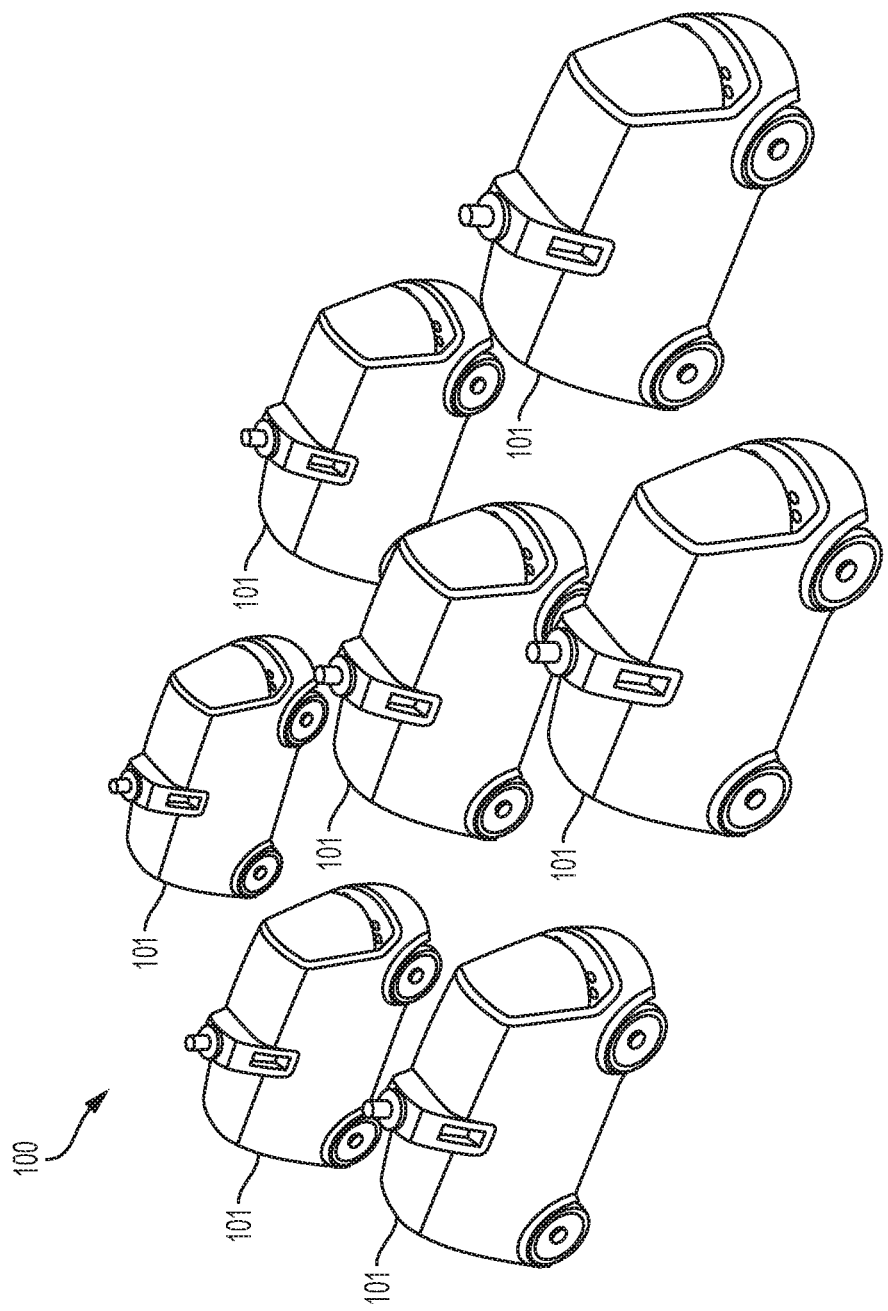
FIG. 1 is an illustration of an exemplary autonomous or semi-autonomous vehicle fleet, in accordance with some embodiments.
Figure 2:
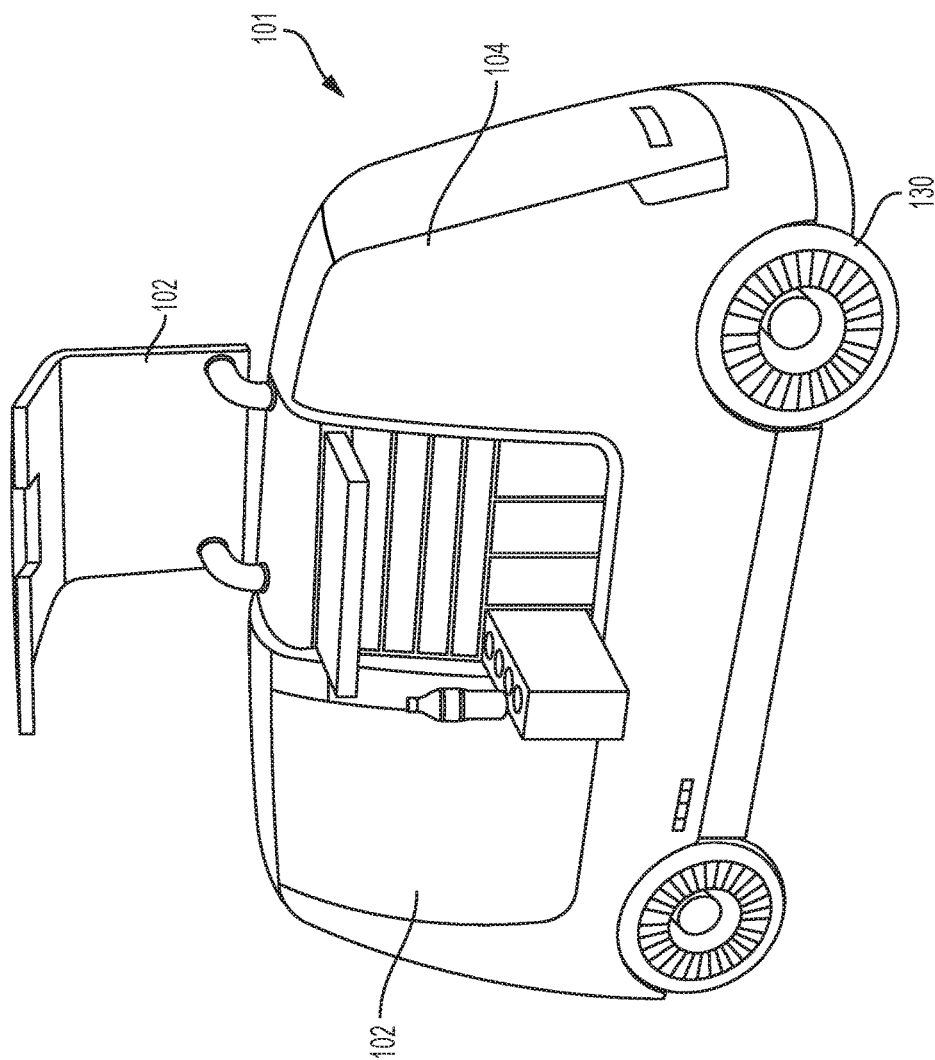
FIG. 2 is an perspective view of an exemplary autonomous or semi-autonomous vehicle comprising a plurality of compartments, in accordance with some embodiments.
Figure 3:
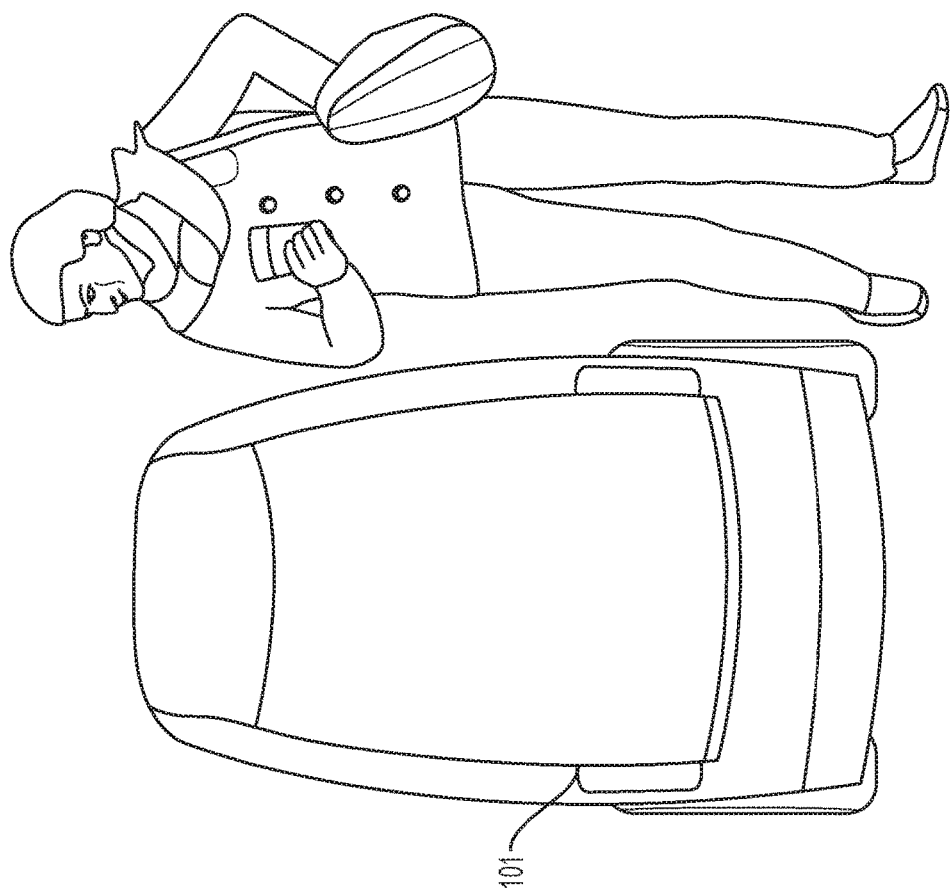
FIG. 3 is an front view of an exemplary autonomous or semi-autonomous vehicle beside a walking person, in accordance with some embodiments.
Figure 4:
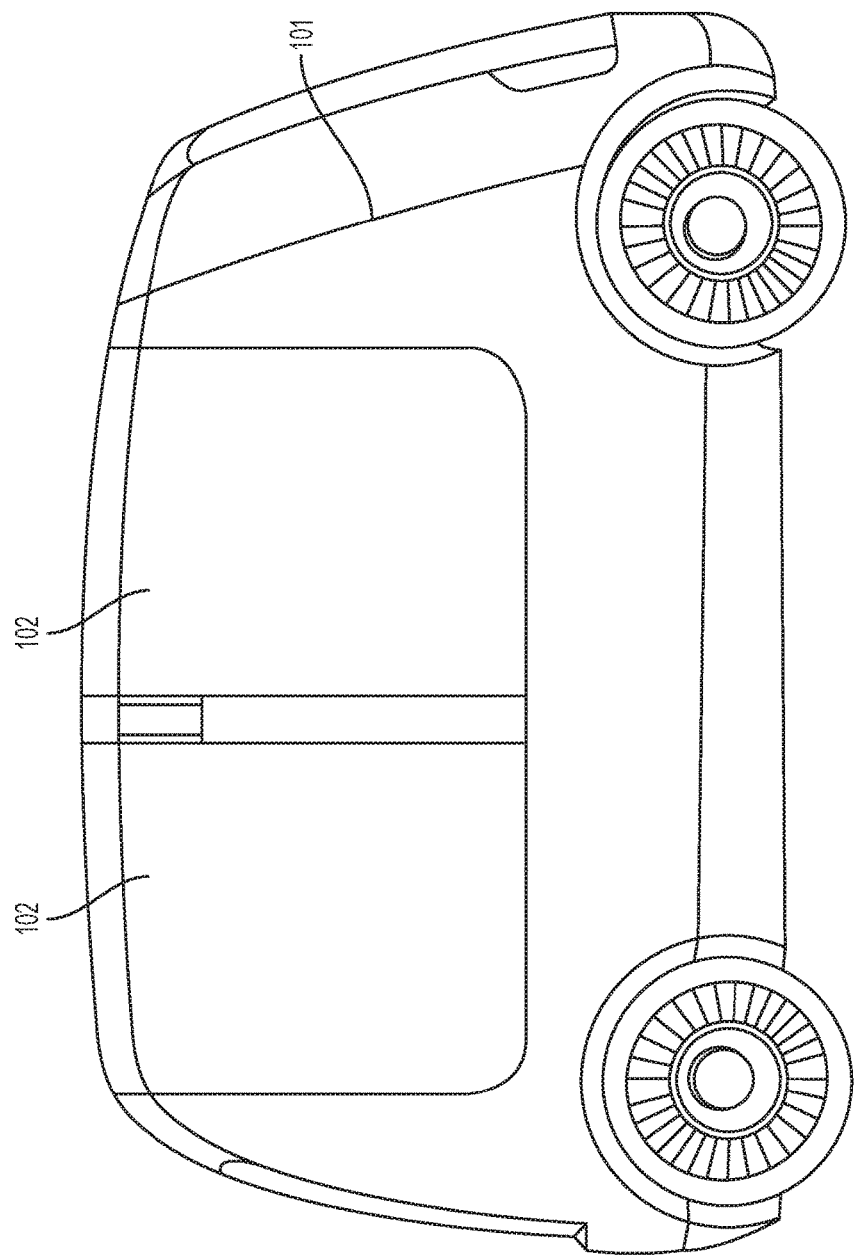
FIG. 4 is an right side view of an exemplary autonomous or semi-autonomous vehicle, in accordance with some embodiments.
Figure 5:
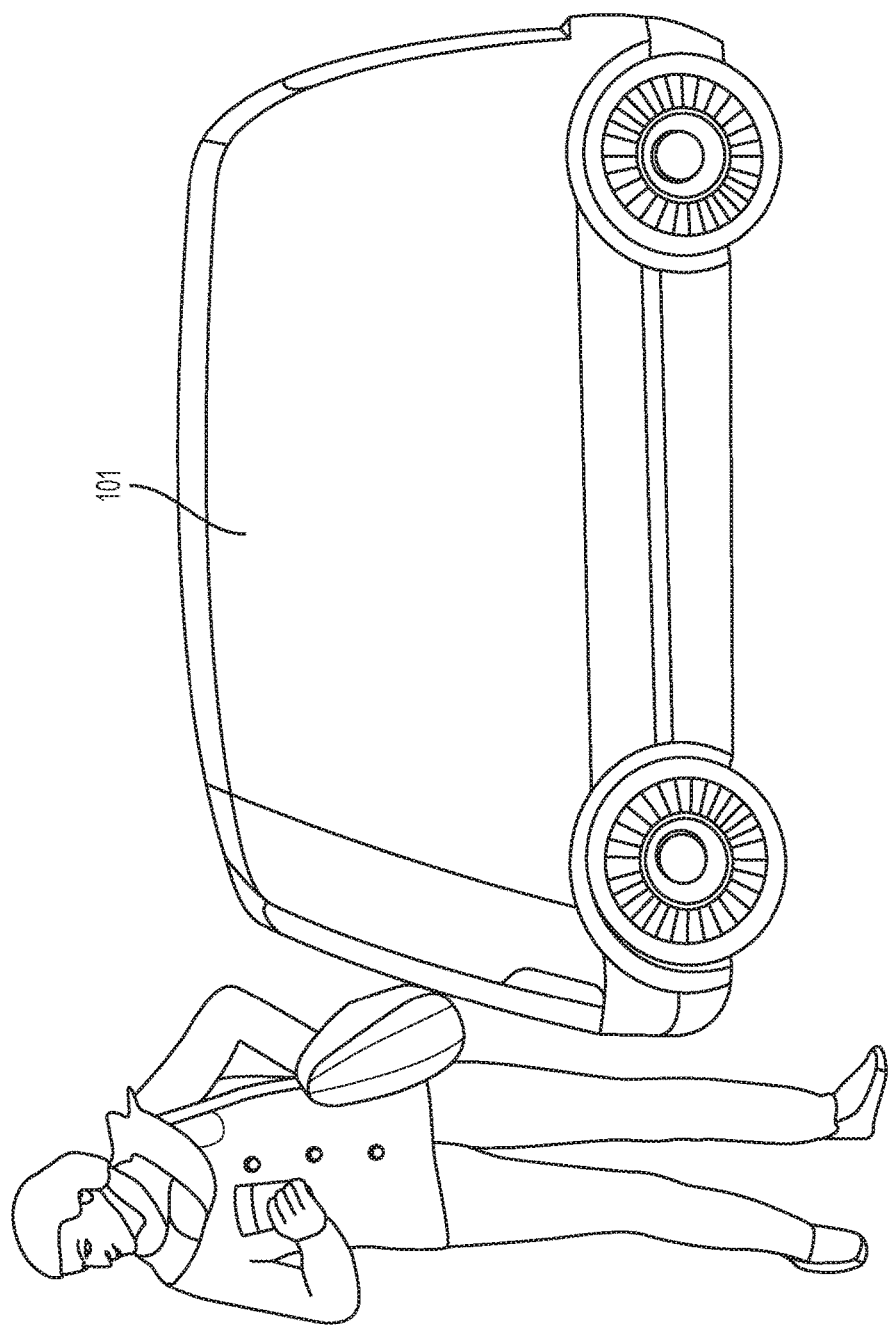
FIG. 5 is an left side view of an exemplary autonomous or semi-autonomous vehicle beside an average person, in accordance with some embodiments.
Figure 6:
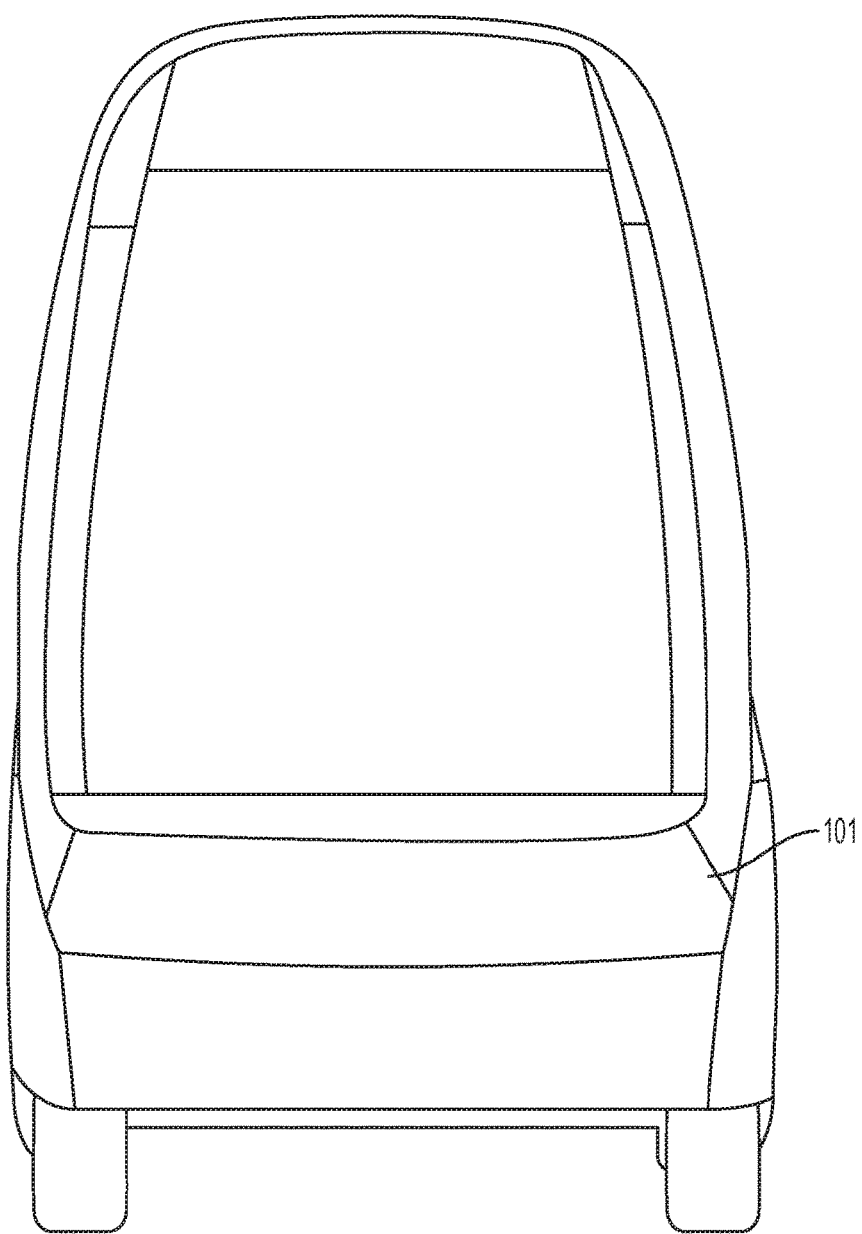
FIG. 6 is an rear view of an exemplary autonomous or semi-autonomous vehicle in accordance with some embodiments.
Figure 7:
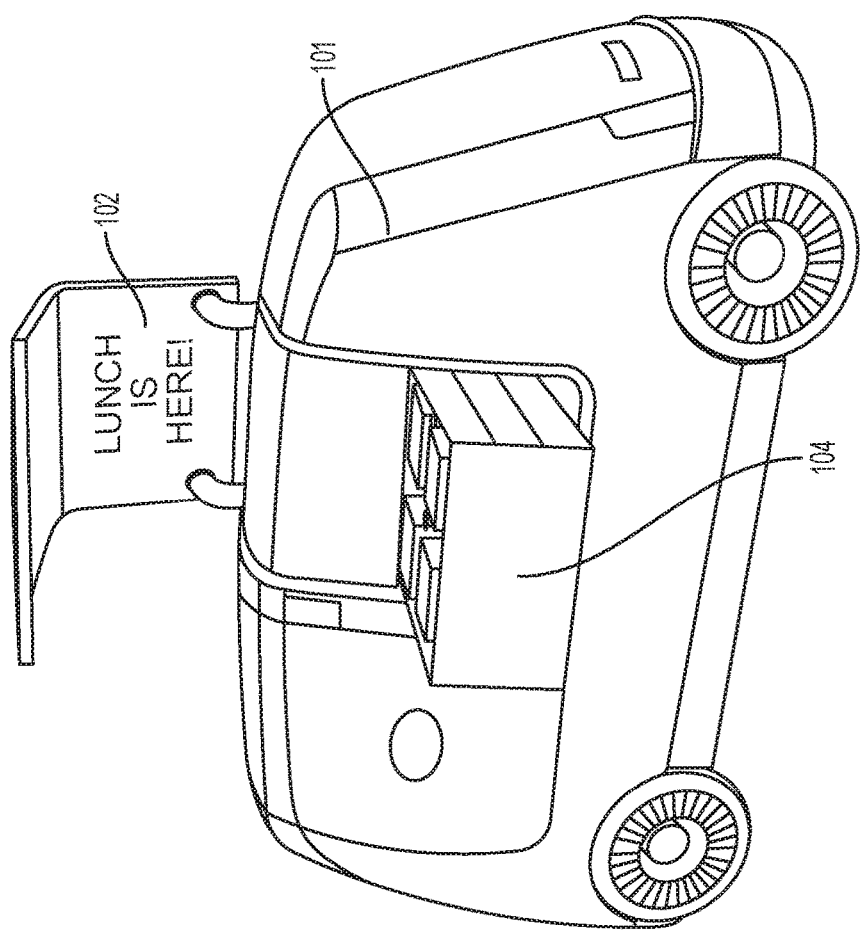
FIG. 7 is a perspective view of an exemplary food delivery autonomous or semi-autonomous vehicle, in accordance with some embodiments.

This disclosure relates to an autonomous and/or semi-autonomous vehicle fleet comprising a plurality of autonomous or semi-autonomous vehicles, for transporting or retrieving deliveries in either open unstructured outdoor environments or closed environments.

Current delivery platforms are mainly configured to receive a location of a customer via a street address for delivery by a human. However, delivery within business or apartment complexes, campuses or public location is limited by the accuracy of the GPS location of the nearest street address, and as such, locational miscommunications reduce the efficiency and ease of such delivery. Further, any delivery to a location within such a complex or public location may require the human driver to find a legal parking sport (or temporarily park illegally) and complete the delivery by hand, wherein either the delivery person or the customer must physically carry each item.

As such, provided herein is a platform for precise delivery of an item to a consumer by a fleet of autonomous or semi-autonomous vehicles. Such a platform may arrive at a customer delivery address and detect a primary entrance of the delivery address for precision delivery. Further, to ensure safe delivery, facial recognition algorithms may be employed for customer verification.

Further, provided herein is an autonomous or semi-autonomous vehicle fleet comprising a plurality of autonomous or semi-autonomous vehicles operating autonomously or semi-autonomously and a fleet management module for coordination of the autonomous or semi-autonomous vehicle fleet, each autonomous or semi-autonomous vehicle within the fleet configured for transporting, delivering or retrieving goods or services and capable of operating in an unstructured open or closed environment, each autonomous or semi-autonomous vehicle comprising, a power system, a conveyance system, a navigation module, at least one securable compartment or a plurality of securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

Autonomous and Semi-Autonomous Vehicles

As illustrated in FIGS. 1-11, the vehicle 101 may comprise an autonomous or semi-autonomous automobile configured for land travel. The vehicle 101 may have a width, a height, and a length, wherein the length may be about 2 feet to about 5 feet. The vehicle 101 may be lightweight and have a low center of gravity for increased stability. The vehicle 101 may be configurable for land, water, or air. The vehicle 101 may comprise a land vehicle such as, for example, a car, a wagon, a van, a tricycle, a truck, a trailer, a bus, a train, or a tram. The vehicle 101 may comprise a watercraft such as, for example, a ship, a boat, a ferry, a landing craft, a barge, a rafts, a hovercraft, or any combination thereof. Alternatively, the vehicle 101 may comprise an aircraft or a spacecraft.

Each vehicle 101 in the fleet may comprise an autonomous or semi-autonomous propulsion system 130 comprising a drive system, a propulsion engine, a wheel, a treads, a wing, a rotor, a blower, a rocket, a propeller, a brake, or any combination thereof.

In one exemplary embodiment, a vehicle 101 comprises a land vehicle configured with a traditional 4-wheeled automotive configuration comprising conventional steering and braking systems. In this embodiment, the drive train may be configurable for standard 2-wheel drive or 4-wheel all-terrain traction drive, and the propulsion system may be configurable as a gas engine, a turbine engine, an electric motor, and/or a hybrid gas/electric engine.

In some embodiments, the vehicle 101 is configured for water travel as a watercraft with a propulsion system comprising a gas engine, a turbine engine, an electric motor and/or a hybrid gas/electric engine, or any combination thereof. In some embodiments, the vehicle 101 is configured for hover travel as an over-land or over-water hovercraft or an air-cushion vehicle (ACV) and is configured with blowers to produce a large volume of air below the hull that is slightly above atmospheric pressure. In some embodiments, the vehicle 101 is configured for air travel as an aerial drone or aerial hovercraft and is configured with wings, rotors, blowers, rockets, and/or propellers and an appropriate brake system.

The vehicle 101 may further comprise an auxiliary solar power system to provide back-up emergency power or power for minor low-power sub-systems. In some embodiments, each vehicle of the vehicle fleet is configured with one or more power sources, such as battery, solar, gasoline, or propane. In some embodiments, the vehicle 101 further comprises a digital display for curated content comprising advertisements, marketing promotions, a public service notification, an emergency notification, or any combination thereof.

Each vehicle 101 in the fleet 100 may comprise a sensor system comprising a plurality of onboard sensors such as, for example, a camera, a video camera, a LiDAR, a radar, an ultrasonic sensor, and a microphone. Each vehicle 101 may further comprise an internal computer for real time navigation and obstacle avoidance, based on the data received by the sensors.

In some embodiments, the vehicles may further comprise an autonomous or semi-autonomous propulsion system sensor configured to monitor drive mechanism performance (e.g., the propulsion engine), power system levels (e.g., battery, solar, gasoline, propane, etc.), monitor drive train performance (e.g., transmission, tires, brakes, rotors, etc.), or any combination thereof.

In some embodiments, the vehicle is further configured to process or manufacture a good. In some embodiments, the vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the vehicle is equipped for financial transactions through debit or credit card readers.

In some embodiments, the vehicle 101 has a driving speed of about 1 mile per hour (mph) to about 90 mph, to accommodate inner-city, residential, and intrastate or interstate driving. In some embodiments, the vehicle 101 is configured for land travel. In some embodiments, each vehicle 101 in the fleet is configured with a working speed range from 13.0 mph to 45.0 mph. In some embodiments, the vehicle 101 is configured with a maximum speed range from 13.0 mph to about 90.0 mph. In some embodiments, vehicle 101 is configured for water travel as a watercraft and is configured with a working speed range from 1.0 mph to 45.0 mph. In some embodiments, the vehicle 101 is configured for hover travel as an over-land or over-water hovercraft and is configured with a working speed range from 1.0 mph to 60.0 mph. In some embodiments, the vehicle 101 is configured for air travel as an aerial drone or aerial hovercraft and is configured with a working speed range from 1.0 mph to 80.0 mph.

Fleet of Autonomous or Semi-Autonomous Vehicles

Provided herein, per FIG. 1, is a vehicle fleet 100, comprising a plurality of autonomous or semi-autonomous vehicles 101.

In some embodiments, one or more of the vehicles 101 in the vehicle fleet 100 are autonomous or semi-autonomous. In some embodiments, one or more of the vehicles 101 in the vehicle fleet 100 are autonomous or semi-autonomous. In some embodiments the semi-autonomous vehicles 101 can be manually controller by an operator. Manual override may be required to, for example, address navigation malfunctions, provider inventory issues, or unanticipated traffic, mechanical failure, electrical failure, traffic accident, and road conditions. In some embodiments of the plurality of autonomous or semi-autonomous vehicles 101 within the fleet 100 is operated on behalf of third party vendor or service provider. The third party vendor or service provider may comprise a food and beverage provider.

In some embodiments, one or more of the vehicles 101 within the vehicle fleet 100 are configured to be part of a sub-fleet 100a that operates independently or in tandem with other sub-fleets 100a. In one example, the sub-fleet 100a of vehicles 101 may only provide a product, service, or level of service associated with a single vendor. Each of the vehicles 101 in the sub-fleet 100a may display a logo of the vendor or an alternative indicator representing the specific product, service, or level of service associated with that vehicle 101. Levels of service may include immediate dedicated rush service, guaranteed morning/afternoon delivery service, and general delivery service. Some sub-fleets 100a may offer a faster or more prioritized service than other sub-fleets 100a.

Fleet Management Module

Figure 12:
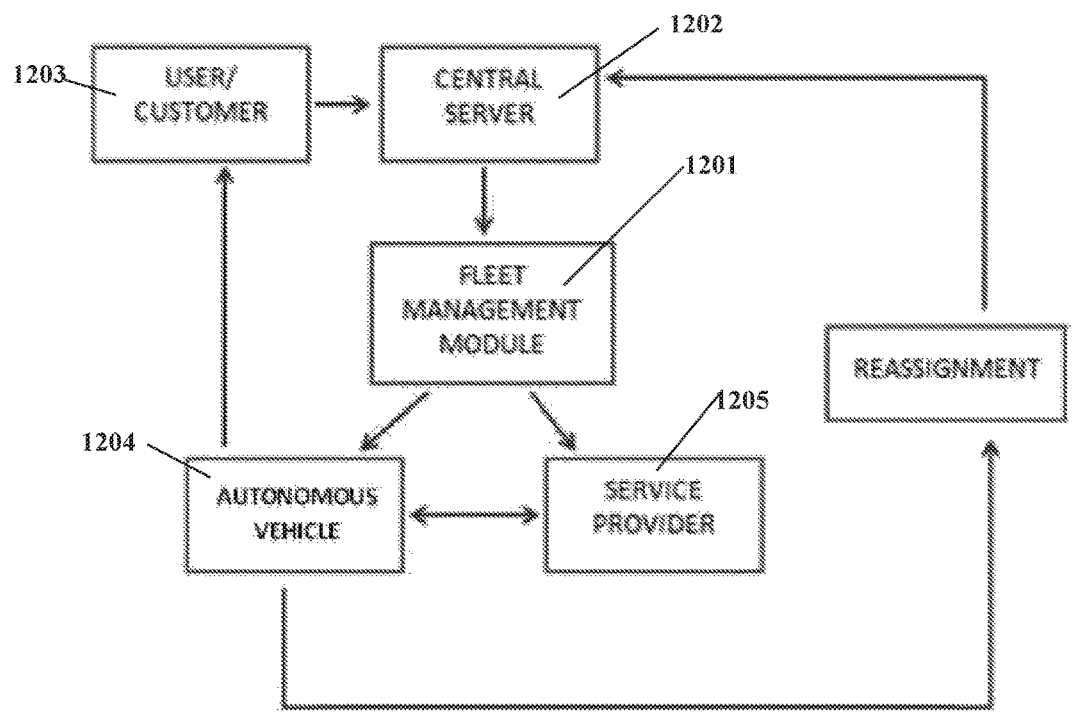
FIG. 12 is an exemplary flowchart representation of the logic for a fleet management control module associated with a central server for the autonomous or semi-autonomous vehicle fleet, in accordance with some embodiments.

Provided herein, per FIG. 12, is a system for fleet management comprising a fleet management module 1201, a central server 1202, a vehicle 1204, a customer 1203, and a service provider 1205. In some embodiments, the fleet management module 1201 coordinates, assigns tasks, and monitors the position of each of the plurality of vehicles 1204 in the fleet. The fleet management module 1201 may coordinate the vehicles 1204 in the fleet to monitor and collect data regarding unstructured open or closed environments, and report to the service provider 1205. As seen, the fleet management module 1201 may coordinate with a central server 1202. The central server 1202 may be located in a central operating facility owned or managed by the fleet owner. The service provider 1205 may comprise a third party provider of a good or service. The service provider 1205 may comprise a vendor, a business, a restaurant, a delivery service, a retailer, or any combination thereof.

In some embodiments, the fleet management module 1201 is configured to receive, store and transmit data to and/or from the service provider 1205. The fleet management module 1201 may receive and transmit data to and/or from the service provider 1205 via a service provider application. In some embodiments, the service provider application comprises a computer application, an internet application, a tablet application, a phone application, or any combination thereof.

In some embodiments, the central server 1202 is configured to receive, store and transmit data to and/or from the customer 1203. The central server 1202 may receive and transmit data to and/or from the customer 1203 via a customer application. In some embodiments, the customer application comprises a computer application, an internet application, a tablet application, a phone application, or any combination thereof.

In some embodiments, the vehicle 1204 comprises a memory device to store the data for future data transfer or manual download.

In one example, an order by a customer 1203 is transmitted to a central server 1202, which then communicates with the fleet management module 1201, which relays the order to the service provider 1205 associated with the order and a vehicle 1204. The fleet management module 1201 may employ one or more vehicles 1204 or sub-fleet vehicles 1204 that are closest to the service provider 1205, customer 1203, or both. The assigned service provider then interacts with that vehicle 1204 through a service provider application to supply the vehicle 1204 with any goods, maps, or instructions associated with the order. The vehicle 1204 then travels to the customer 1203 and reports completion of the order to at least one of the customer 1203, the service provider 1205, the central server 1202, and the fleet management module 1201.

In some embodiments the vehicle 1204 may be operated on behalf of the service provider 1205, wherein at least one of the central server 1202 and the fleet management module 1201 is operated by the service provider 1205. In any one of the embodiments, the vehicle 1204 is controlled directly by the customer 1203, the service provider 1205, or both. In some embodiments, human interaction of the vehicle 1204 may be required to address maintenance issues such as mechanical failure, electrical failure or a traffic accident.

In one example, the fleet management module 1201 receives an instruction from the service provider 1205 to collect an item at a first location and deliver the item to a second location. Upon receipt of the instruction, the fleet management module 1201 may assign one or more of the vehicles 1204 to perform the instruction by navigating the one or more of the vehicles 1204 the first location. The one more of the vehicles 1204 may then confirm the receipt of the item and navigate to the second location. The one more of the vehicles 1204 may then deliver the item to the second location and confirm receipt of the delivery. In some embodiments, the one more of the vehicles 1204 may further receive an identification associated with the first location, the second location, or both, to enable receipt and delivery of the item.

In one example, a request by the customer 1203 is sent to the central server 1202, which then communicates with the fleet management module 1201 to relay the request to the service provider 1205, which instructs the vehicles 1204. The fleet management module 1201 may select one or more of the vehicles 1204 within the geographic region and/or proximity of the customer 1203, the service provider 1205, or both. The vehicles 1204 may be first directed to a location associated with the service provider 1205 to receive an item associated with the request. The vehicle 1204 may then travels to a location associated with the customer 1203. The customer 1203 may then interacts with the one or more vehicle 1204 to retrieve the item. The customer 1203 may retrieve the item by opening a compartment within the vehicle 1204. The customer 1203 may open the compartment within the vehicle 1204 through a customer application, or a customer interface comprising, for example, an RFID reader, a touchpad, a keypad, a voice command, or a vision-based recognition. Upon completion the vehicles 1204 may then report a completion of the request to the fleet management module 1201 and be reassigned to a subsequent request.

In some embodiments, the autonomous or semi-autonomous fleet may be strategically positioned throughout a geographic region in anticipation of a known demand. Demand for autonomous or semi-autonomous vehicle services may be predicted by storing historical demand data relating to the quantity, timing, and type of request received in each region. Such demand predictions may further be weighted by the cost or importance of the good or service and employ historical trends for higher efficiency and throughput. As such, the fleet management module may position the autonomous or semi-autonomous vehicles as close as possible to the expected source locations.

Figure 13:
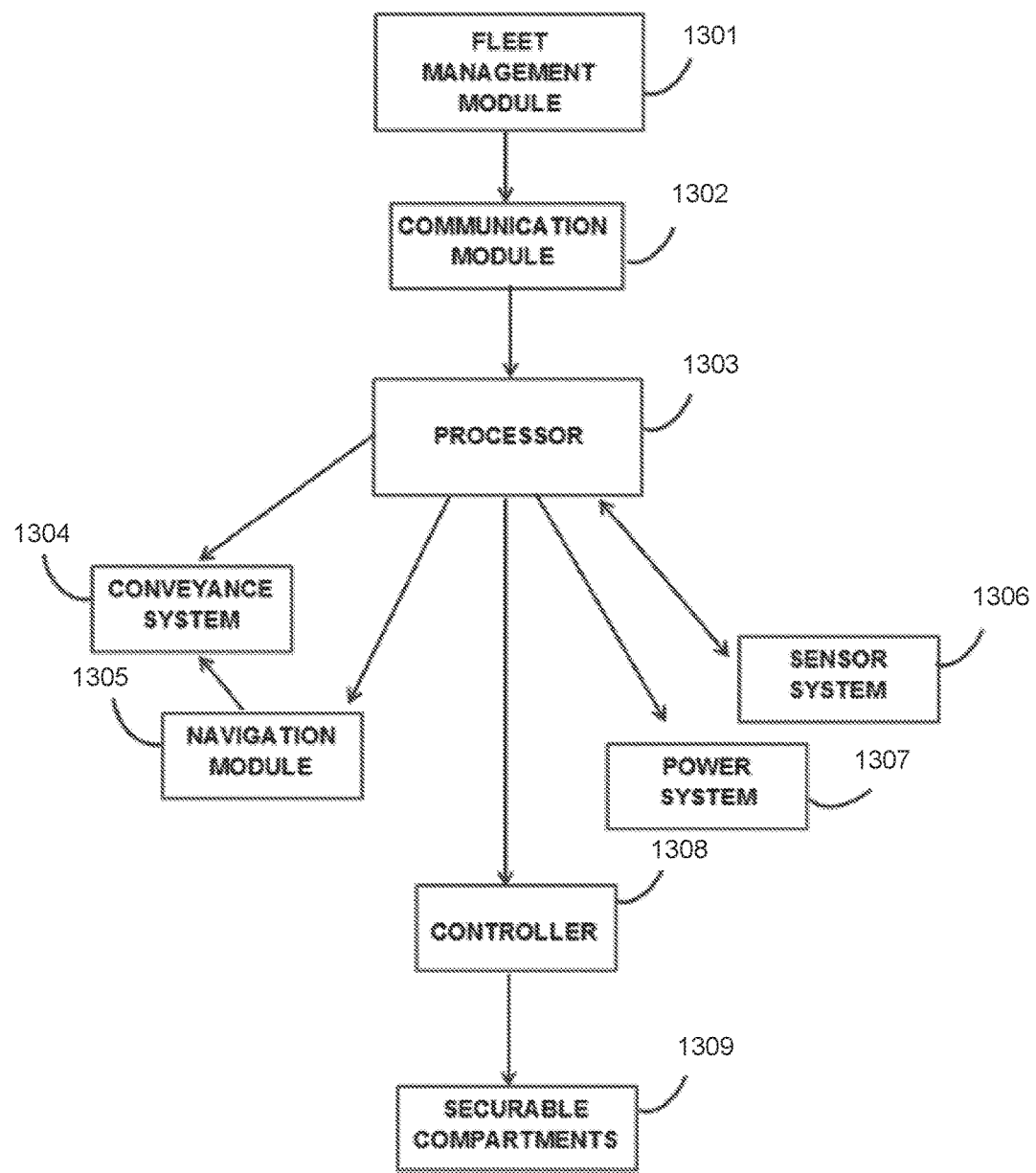
FIG. 13 is an exemplary flowchart representation of the logic flow from the Fleet Management Control Module through the autonomous or semi-autonomous vehicle processor to the various systems and modules of the autonomous or semi-autonomous vehicle, in accordance with some embodiments.

Per FIG. 13, the fleet management module 1301 instructs the processor 1303 of the autonomous or semi-autonomous vehicle via a communication module 1302. The processor 1303 may be configured to send an instruction and receive a sensed data from the sensor system 1306, and may further control at least one of the power system 1307, the navigation module 1305, and the conveyance system 1304. The processor 1303 may additionally be configured to instruct a controller 1308 to open a securable compartment 1309 to release any contents associated with an order. The processor 1303 may allow manual override of the conveyance system 1304, the navigational system 1305, or both.

In some embodiments, the processor 1303 is in functional communication with the communication module 1302. In some embodiments, the communication module 1302 is adapted to receive, store, and/or transmit data to and from the customer and the fleet management module 1301. In some embodiments, the data comprises a schedule, a request or order, a current location, a delivery location, a service provider location, a route, an estimated time of arrival (ETA), a repositioning instruction, a vehicle condition, a vehicle speed, or any combination thereof. In some embodiments, the processor 1303 is capable of both high-level computing for processing as well as low-level safety-critical computing capacity for controlling the hardware. The processor 1303 may configured to direct the conveyance system 1304, the navigation module 1305, the sensor system 1306, the power system 1307, the controller 1308, or any combination thereof. The processor 1303 may reside aboard the autonomous or semi-autonomous vehicle, or at a remote location.

In some embodiments, the communication module 1302 is configured to receive, store and transmit data via wireless transmission (e.g., 4G, 5G, or satellite communications). In some embodiments, the wireless transmission occurs via: a central server, a fleet management module, a mesh network, or any combination thereof. In some embodiments, the customer application is configured to send and receive data via an electronic device comprising a phone, a personal mobile device, a personal digital assistant (PDA), a mainframe computer, a desktop computer, a laptop computer, a tablet computer, and/or wearable computing device comprising: a communication headset, smart glasses, or a combination thereof.

In some embodiments, the fleet management module 1301 directs each of the vehicles 1204 through a navigation module 1305. In some embodiments, the navigation module 1305 controls the conveyance system 1304 to translate the autonomous or semi-autonomous vehicle through the unstructured open or closed environments. In some embodiments, the navigation module 1305 comprises an HD maps, a weather condition, an elevation map, a digital map, a street view photograph, a GPS point, or any combination thereof. In some embodiments, the map is generated by a customer, a customer, a service provider, a fleet operator, an online repository, a public database, or any combination thereof. In some embodiments, the map is generated only for intended operational geography. The maps may be augmented or confirmed by data obtained by the sensor system 1306. The navigation module 1305 may further implement data collected by the sensor system 1306 to determine the location and/or the surroundings of the autonomous or semi-autonomous vehicle. In some embodiments, the map further comprises a navigation marker comprising a lane, a road sign, an intersection, a grade, or any combination thereof. As such the navigation module 1305, in combination with processors and/or applications vehicles 1204 enable a safe, robust navigation trajectory.

In some embodiments, the fleet management module 1301 is configured to determine and predict a geographic demand for the autonomous or semi-autonomous vehicles for strategic placement throughout a geographic region in anticipation of a known demand. The fleet management module 1301 may determine and predict a geographic demand by storing data relating the location, quantity, time, price, item, item type, service, service type, service provider, or any combination thereof of placed orders and requests. Further, the service provider may provide independently measured trends to supplement or augment the measured trends. As such, the vehicles may be strategically placed to reduce transit and idle time and to increase sales volume and efficiency.

Communications Module

Each autonomous or semi-autonomous vehicle 101 may comprise a communication module 160 configurable to receive and send data from the fleet management module 120, and the user. In some embodiments the data is related user interactions and autonomous or semi-autonomous vehicle fleet interactions, comprising: scheduled requests or orders, on-demand requests or orders, or a self-positioning request. In some embodiments, the communication module 160 receives and sends data via wireless transmission. In some embodiments, the wireless transmission occur via a mobile application on an electronic device via a central server, a fleet management module, a mesh network, cellular communication (e.g., 3G, 4G, and 5G), satellite communications, or any combination thereof. In some embodiments, the electronic device comprises a phone, a personal mobile device, a personal digital assistant (PDA), a mainframe computer, a desktop computer, a laptop computer, a tablet computer, and/or wearable computing device comprising: a communication headset, smart glasses, a contact lens or lenses, a digital watch, a bracelet, a ring, a jewelry, or a combination thereof.

In some embodiments, business 204 and customers 202 communicate with the fleet operator 200 through their own app/interface. In some embodiments, each autonomous or semi-autonomous vehicle 101 further comprises a memory device to store the data for future data transfer or manual download.

Securable Compartments

Figure 8:
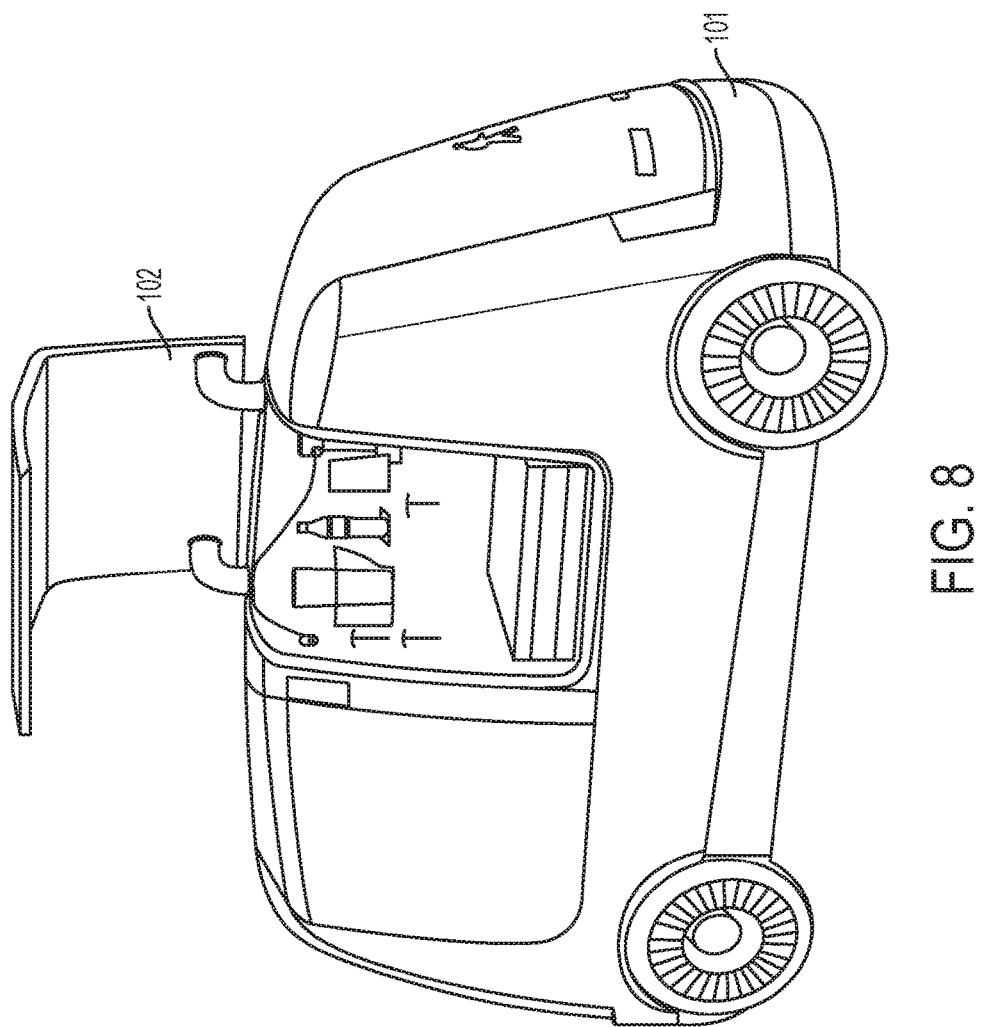
FIG. 8 is a perspective view of an exemplary pizza delivery autonomous or semi-autonomous vehicle, in accordance with some embodiments.
Figure 9:
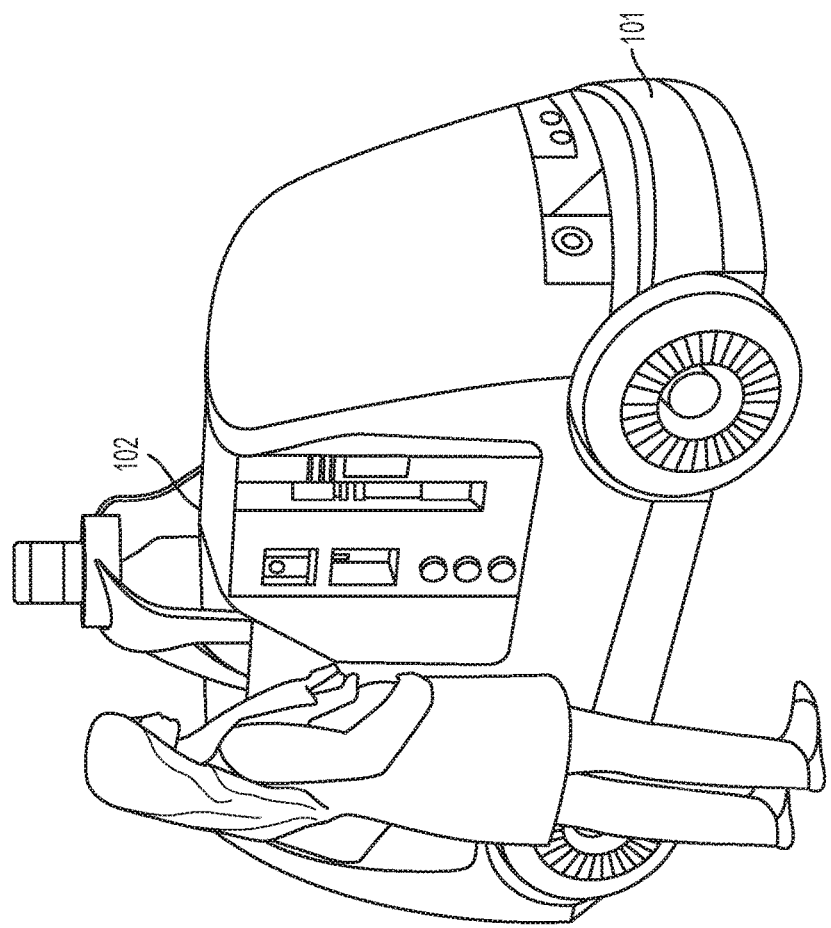
FIG. 9 is a perspective view of an exemplary coffee delivery autonomous or semi-autonomous vehicle, in accordance with some embodiments.
Figure 10:
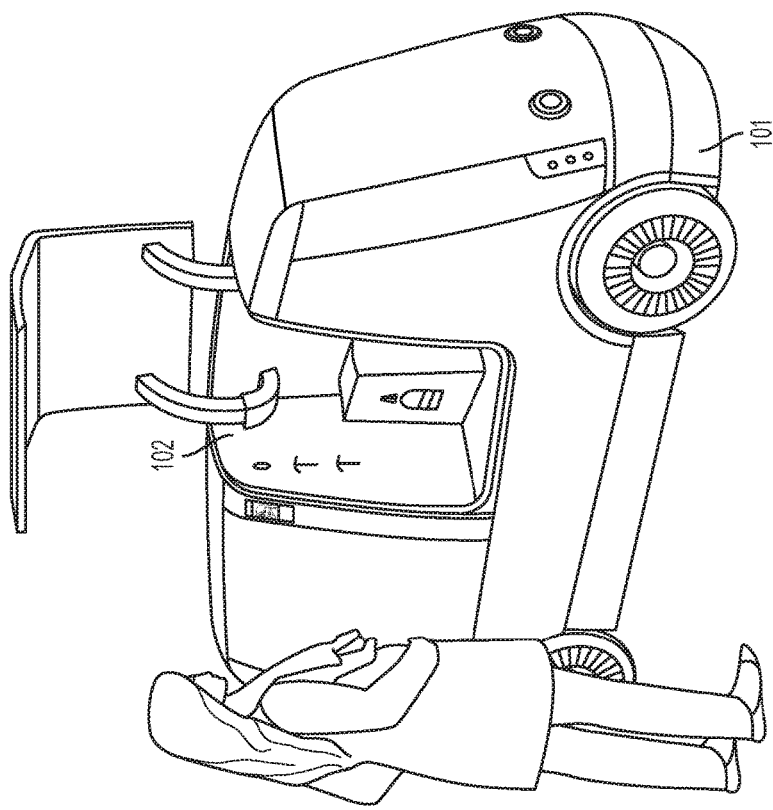
FIG. 10 is a perspective view of an exemplary meal delivery autonomous or semi-autonomous vehicle comprising a lighted interior, in accordance with some embodiments.
Figure 11A:
FIG. 11A is a perspective view of an exemplary vending autonomous or semi-autonomous vehicle, in accordance with some embodiments.
Figure 11B:
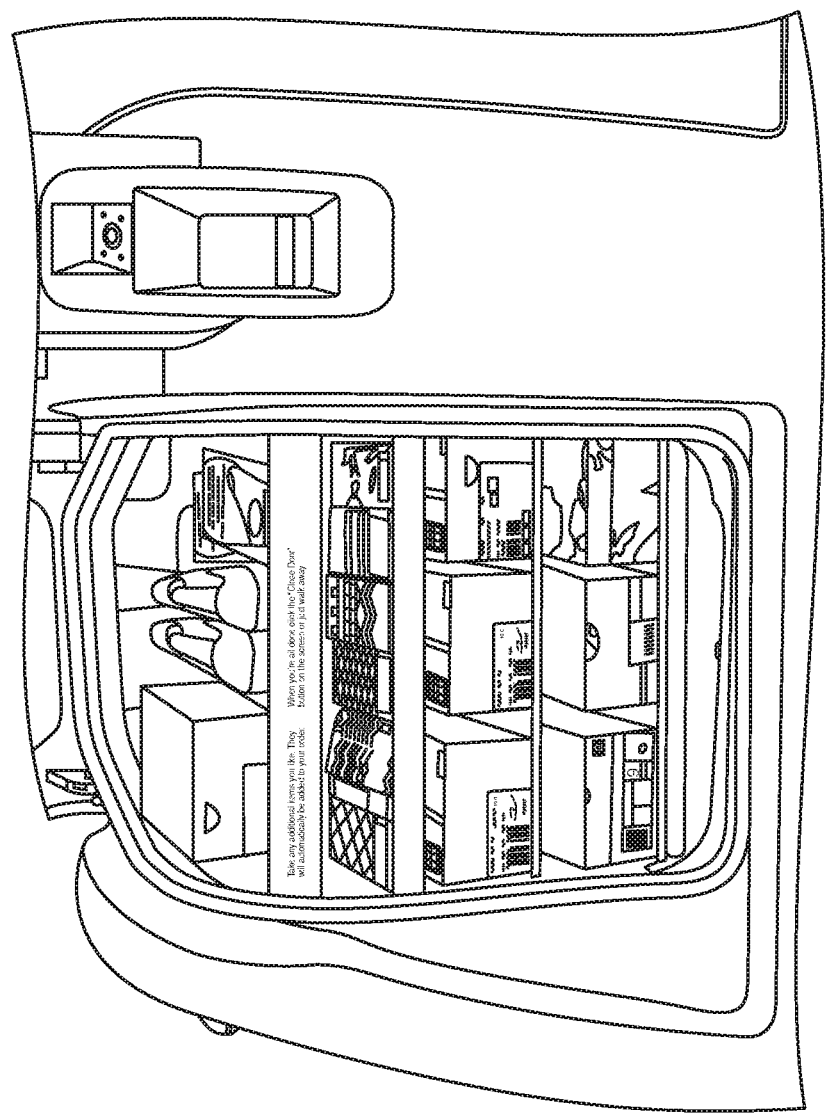
FIG. 11B is a perspective view of another exemplary vending autonomous or semi-autonomous vehicle, in accordance with some embodiments.

As illustrated in FIGS. 7-11, in some embodiments, the plurality of compartments may be humidity and/or temperature controlled for: hot goods; cold goods; wet goods; dry goods, or combinations thereof. In some embodiments, the plurality of securable compartments are configurable for a plurality of goods. Exemplary compartments and goods comprise: bookshelves for books; thin drawers for documents; larger box-like drawers for packages, sized compartments for vending machines, embedded coffee makers, pizza ovens, and dispensers. In some embodiments, the plurality of securable compartments can be configured and reconfigured based on: anticipated demands, patterns of behaviors, area of service, the types of goods to be transported, or any combination thereof. Alternately, the compartments may be configured to contain a set of goods to form a mobile marketplace (similar to a mini bar at a hotel). Further, as illustrated in FIGS. 8-10, the compartment may further comprise various additional amenities such as lights for night deliveries, condiment dispensers, and display screens.

At least one of the autonomous or semi-autonomous vehicle and the compartment may comprise a controller 150 configured to associate each one of the plurality of securable compartments 102, 104 to an assigned customer 202 or provider 204 and provide entry to the securable compartments 102, 104 upon authorization. Each securable compartments 102, 104 may be secured separately to transport goods to separate sets of customers 202. As such, the autonomous or semi-autonomous vehicle may deliver a first good or service to a first assigned customer from within a first securable compartment 102, 104 and then deliver a second good or service to a second assigned customer from within the securable compartment 102, 104.

Upon arrival of the autonomous or semi-autonomous vehicle to the customer destination, the customer may open their respective compartment(s) by verifying their identity. In one embodiment, the customer verifies their identity by providing a PIN (e.g., 4 digit number) via a touchscreen or a keypad within the autonomous or semi-autonomous vehicle, which they received upon initial request/order. The customer can verify themselves using their mobile phone and an RFID reader on the autonomous or semi-autonomous vehicle. Alternatively, the customer is verified through voice recognition of a keyword or key-phrase, wherein the autonomous or semi-autonomous vehicle comprises a microphone and a voice recognition application for recognition thereof. Further, in another embodiment, the customer is verified through facial or identification recognition, wherein the autonomous or semi-autonomous vehicle comprises a camera and a facial recognition application for recognition thereof. Additionally or alternatively, the customer is verified through a magnetic strip, RFID key or any other computer readable form of identification. Finally, in another embodiment, the customer is verified by entering a code or identification value on their mobile device, wherein the autonomous or semi-autonomous vehicle receives a cellular signal comprising a confirmation of the user or data related to the code of identification of the user.

In some embodiments, the vehicle could be configured for water travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for hover travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for aerial drone or aerial hover travel, providing at least one and preferably two large storage compartments, and more preferably, at least one large compartment is configured with a plurality of smaller internal secure compartments of variable configurations to carry individual items that are to be delivered to, or need to be retrieved from customers.

Operating Environments

The autonomous or semi-autonomous vehicles 101 in the fleet 100 may be configured to operate within a variety of unstructured open operating environments to enable service to a broad range of locations.

In some embodiments, the unstructured open environment is a non-confined geographic region accessible by navigable pathways comprising: public roads; private roads; bike paths; open fields, open public lands, open private lands, pedestrian walkways, lakes, rivers, or streams.

In some embodiments, the closed environment is a confined, enclosed, or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the unstructured open environment is a non-confined airspace or even near-space environment which includes all main layers of the Earth's atmosphere comprising the troposphere, the stratosphere, the mesosphere, the thermosphere and the exosphere. In some embodiments, the navigation module controls routing of the conveyance system of the vehicles in the fleet in the unstructured open or closed environments.

Goods and Services

In some embodiments, the user comprises a fleet manager, a sub-contracting vendor, a service provider, a customer, a business entity, an individual, or a third party.

In some embodiments, the services comprises a subscription service, a prescription service, a marketing service, an advertising service, a notification service, a requested service, an ordered service, a scheduled delivery service, or any combination thereof. For example, the scheduled delivery services may include special repeat deliveries such as groceries, prescriptions, drinks, mail, documents, or any combination thereof.

In some embodiments, the services alternatively or further comprise a return of a good (e.g., a signed document), receiving one set of goods and returning a different set of goods (e.g., product replacement/returns, groceries, merchandise, books, recording, videos, movies, payment transactions, etc.), or a third party user providing instruction and or authorization to a goods or service provider to prepare, transport, deliver and/or retrieve goods to a principle user in a different location. In some embodiments, the services further or alternatively comprise: advertising services, land survey services, patrol services, monitoring services, traffic survey services, signage and signal survey services, architectural building, or road infrastructure survey services.

In some embodiments, the service further or alternatively comprises processing or manufacturing a good. In some embodiments, the autonomous or semi-autonomous vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the service comprises a financial transaction.

In some embodiments, the service comprises advertising, marketing, public safety, public service, or any combination thereof.

Controller(s) and Processor(s)

In some embodiments, each autonomous or semi-autonomous vehicle in the autonomous or semi-autonomous vehicle fleet is equipped with one or more processors capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each autonomous or semi-autonomous vehicle in the autonomous or semi-autonomous vehicle fleet is equipped with a controller configurable to associate each one of the plurality of securable compartments to an assignable customer or provider and provide entry when authorized.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® P53®, Sony® P54®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 14:
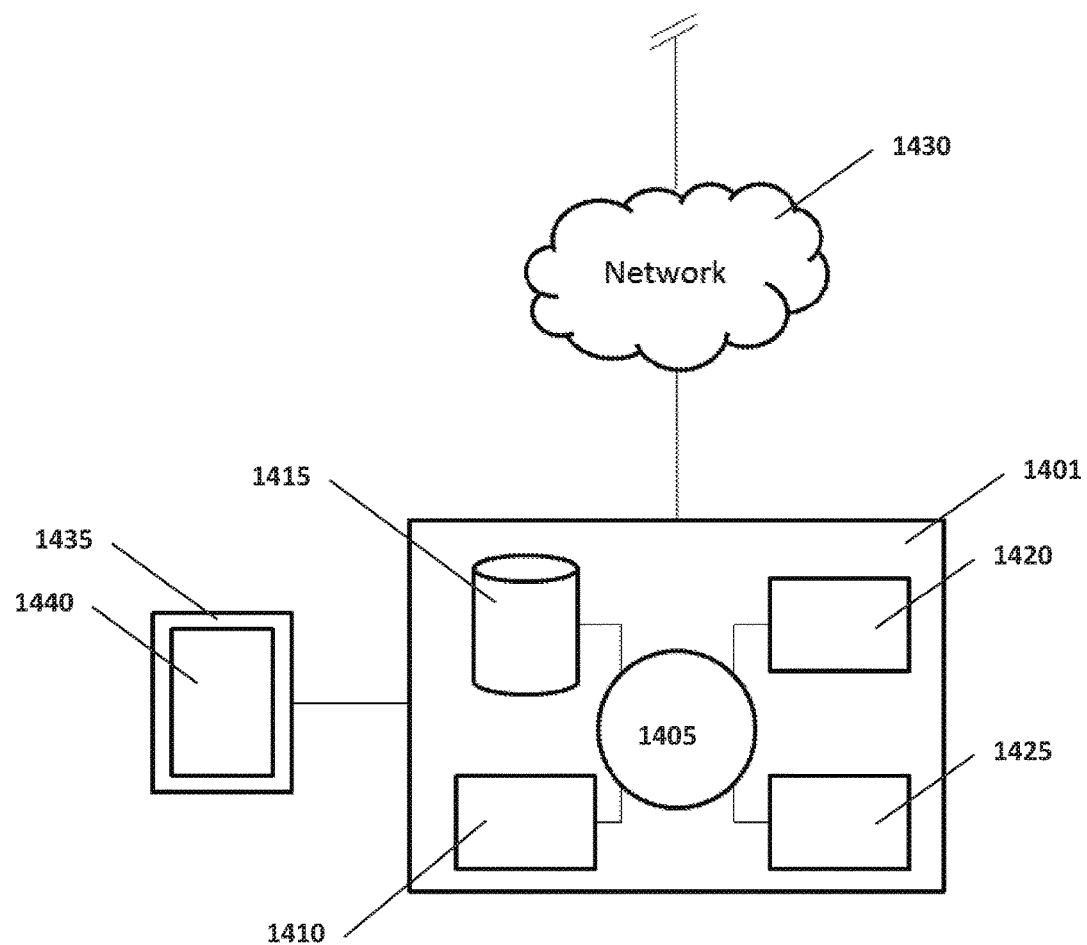
FIG. 14 shows a non-limiting schematic diagram of a digital processing device; in this case, a device with one or more CPUs, a memory, a communication interface, and a display.

Referring to FIG. 14, in a particular embodiment, a digital processing device 1401 is programmed or otherwise configured to managing autonomous or semi-autonomous vehicles. The device 1401 is programmed or otherwise configured to manage autonomous or semi-autonomous vehicles. In this embodiment, the digital processing device 1401 includes a central processing unit (CPU, also "processor" and "computer processor" herein) 1405, which is optionally a single core, a multi core processor, or a plurality of processors for parallel processing. The digital processing device 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 comprises a data storage unit (or data repository) for storing data. The digital processing device 1401 is optionally operatively coupled to a computer network ("network") 1430 with the aid of the communication interface 1420. The network 1430, in various cases, is the internet, an internet, and/or extranet, or an intranet and/or extranet that is in communication with the internet. The network 1430, in some cases, is a telecommunication and/or data network. The network 1430 optionally includes one or more computer servers, which enable distributed computing, such as cloud computing. The network 1430, in some cases, with the aid of the device 1401, implements a peer-to-peer network, which enables devices coupled to the device 1401 to behave as a client or a server.

Continuing to refer to FIG. 14, the CPU 1405 is configured to execute a sequence of machine-readable instructions, embodied in a program, application, and/or software. The instructions are optionally stored in a memory location, such as the memory 1410. The instructions are directed to the CPU 105, which subsequently program or otherwise configure the CPU 1405 to implement methods of the present disclosure. Examples of operations performed by the CPU 1405 include fetch, decode, execute, and write back. The CPU 1405 is, in some cases, part of a circuit, such as an integrated circuit. One or more other components of the device 1401 are optionally included in the circuit. In some cases, the circuit is an application specific integrated circuit (ASIC) or a field programmable gate array (FPGA).

Continuing to refer to FIG. 14, the storage unit 1415 optionally stores files, such as drivers, libraries and saved programs. The storage unit 1415 optionally stores user data, e.g., user preferences and user programs. The digital processing device 1401, in some cases, includes one or more additional data storage units that are external, such as located on a remote server that is in communication through an intranet or the internet.

Continuing to refer to FIG. 14, the digital processing device 1401 optionally communicates with one or more remote computer systems through the network 1430. For instance, the device 1401 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 101, such as, for example, on the memory 1410 or electronic storage unit 1415. The machine executable or machine readable code is optionally provided in the form of software. During use, the code is executed by the processor 1405. In some cases, the code is retrieved from the storage unit 1415 and stored on the memory 1410 for ready access by the processor 1405. In some situations, the electronic storage unit 1415 is precluded, and machine-executable instructions are stored on the memory 1410.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®

Figure 15:
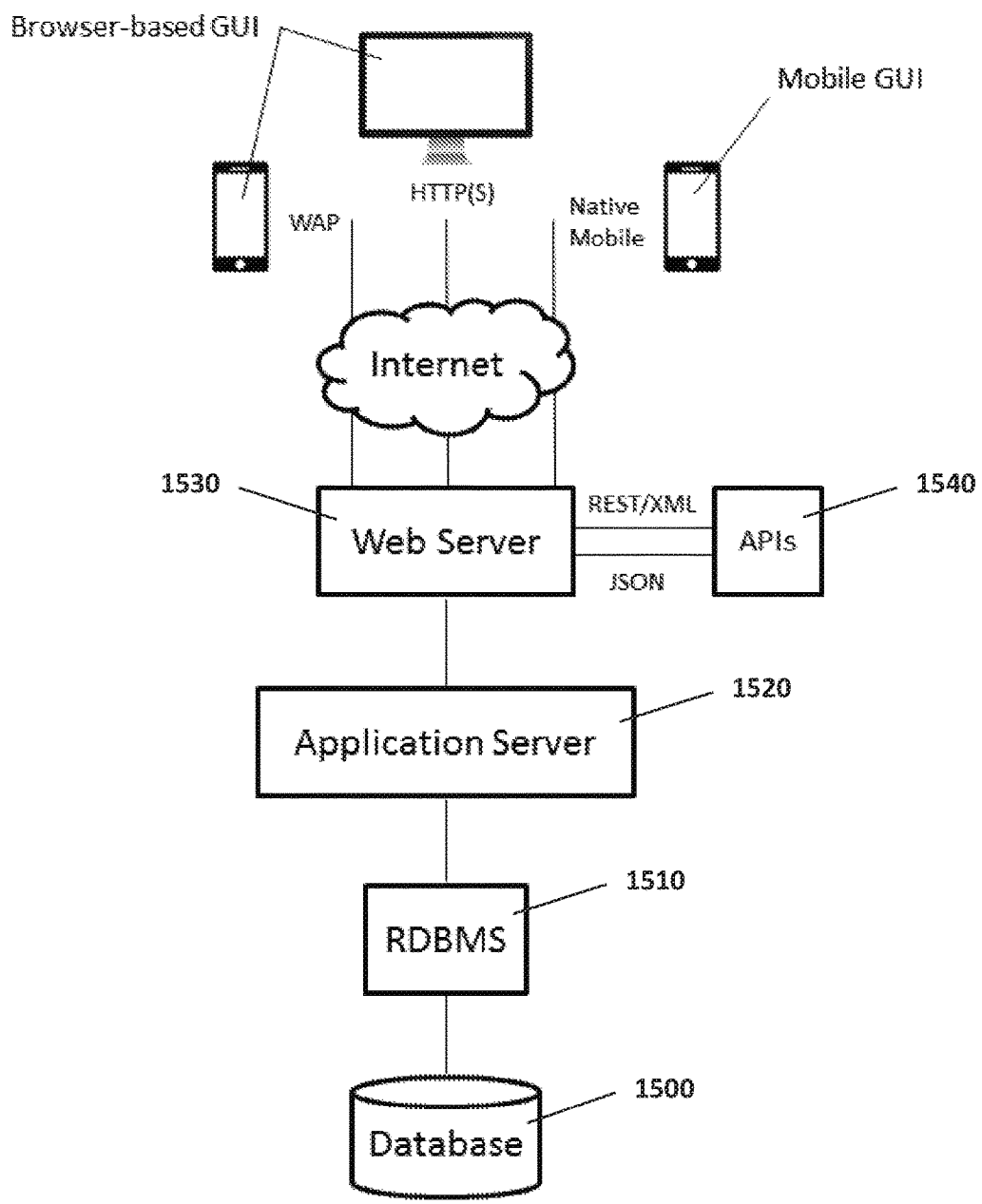
FIG. 15 shows a non-limiting schematic diagram of a web/mobile application provision system; in this case, a system providing browser-based and/or native mobile user interfaces.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1520 (such as Java servers, .NET servers, PHP servers, and the like) and one or more web servers 1530 (such as Apache, IIS, GWS and the like). The web server(s) optionally expose one or more web services via app application programming interfaces (APIs) 1540. Via a network, such as the internet, the system provides browser-based and/or mobile native user interfaces.

Figure 16:
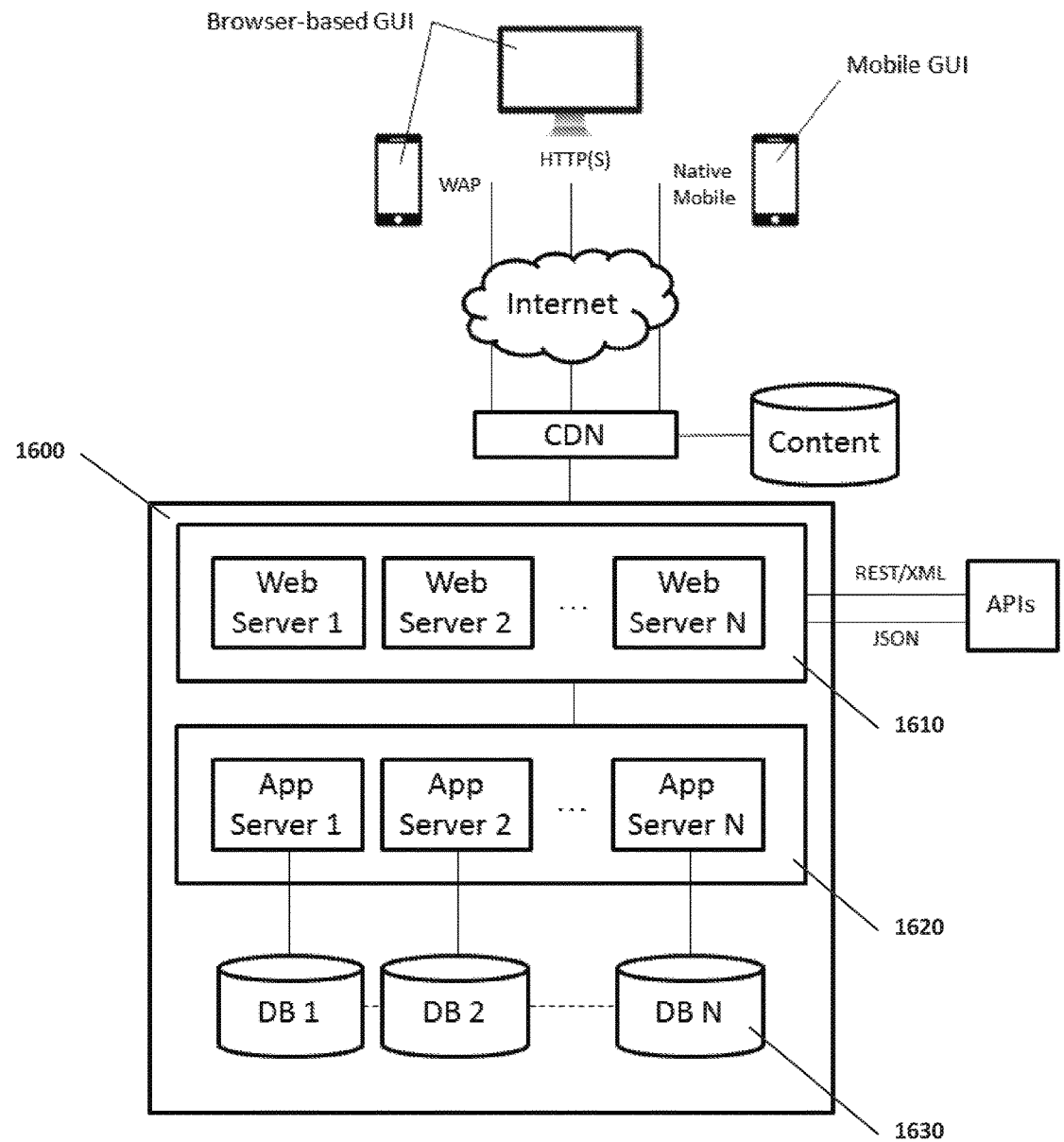
FIG. 16 shows a non-limiting schematic diagram of a cloud-based web/mobile application provision system; in this case, a system comprising an elastically load balanced, auto-scaling web server and application server resources as well synchronously replicated databases.
Figure 17:
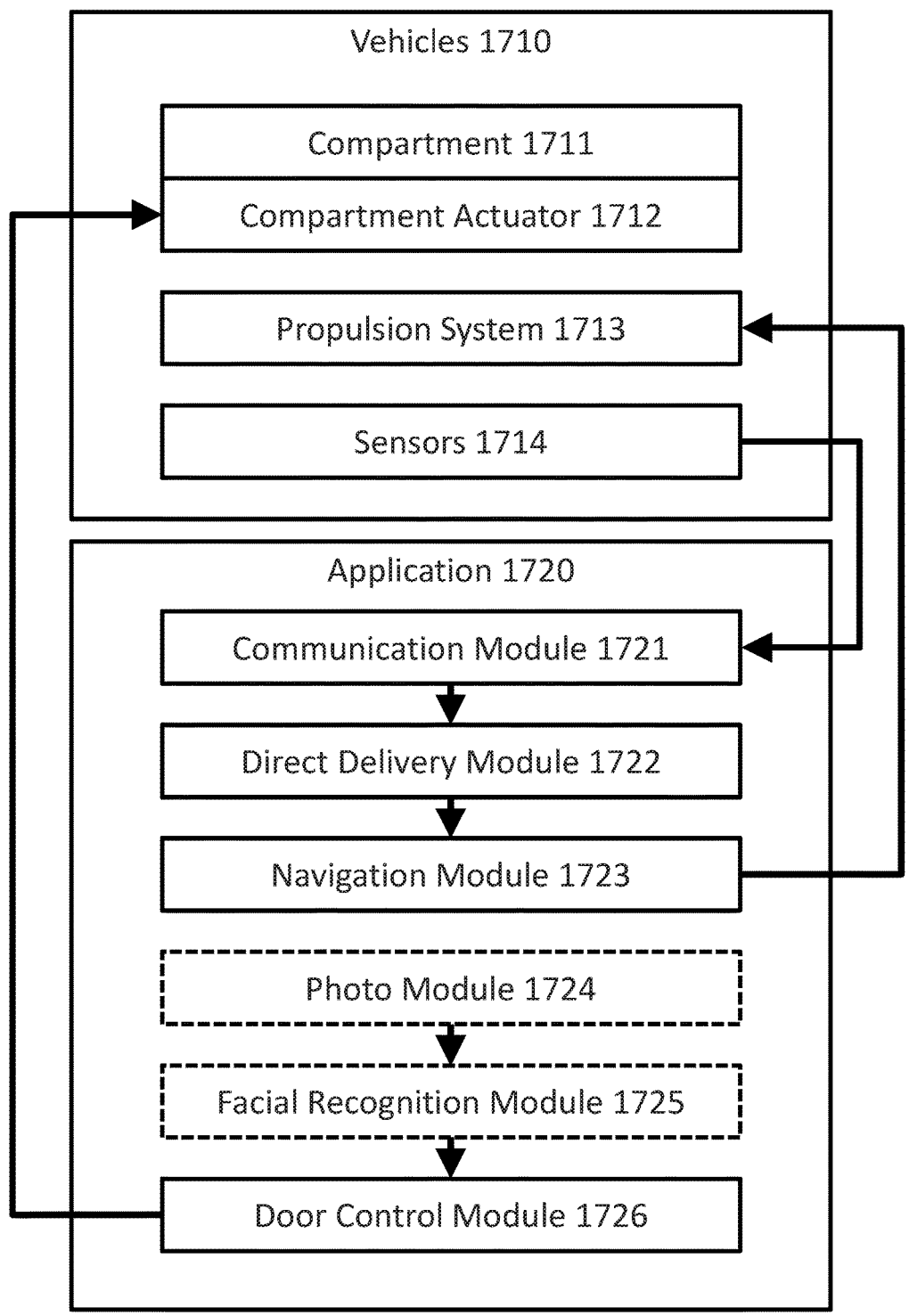
FIG. 17 shows a non-limiting schematic diagram of a system for direct fulfillment of an order to a customer.

Referring to FIG. 16, in a particular embodiment, an application provision system alternatively has a distributed, cloud-based architecture 1600 and comprises elastically load balanced, auto-scaling web server resources 1610, and application server resources 1620 as well synchronously replicated databases 1630.

System for Direct Fulfillment of an Order to a Customer

One aspect provided herein is a system for direct fulfillment of an order to a customer, the system comprising an autonomous or semi-autonomous vehicle 1710 and a processor configured to provide a fulfillment application 1720.

The autonomous or semi-autonomous vehicle 1710 may comprise a compartment 1711, a compartment actuator 1712, an autonomous or semi-autonomous propulsion system 1713, and one or more sensors 1714. The one or more sensors 1714 may be configured to measure a specific area data corresponding to a customer address associated with the order, a facial feature of an order recipient, and a compartment status of the compartment 1711. In some embodiments, the sensor comprises a RADAR, a LiDAR, a camera, a video camera, a proximity sensor, a contact sensor, a light sensor, an infrared sensor, a switch, or any combination thereof. In some embodiments, the specific area data comprises a three-dimensional spatial data. In some embodiments, the primary entrance location comprises at least one of a door, an entranceway, a pathway, a garage door, a gate, an atrium, a foyer, a gateway, and a driveway.

The compartment 1711 may be configured to secure an item associated with the order. The compartment actuator 1712 may be configured to open and close the compartment door. In some embodiments, the compartment actuator 1712 comprises a lock, a spring, a pneumatic cylinder, a motor, a gear, a pulley, a belt, a rack, a pinion, or any combination thereof. In some embodiments, the compartment 1711 further comprises an item removal sensor configured to detect removal of the item from the compartment 1711.

The fulfillment application 1720 may comprise communication module 1721, a direct delivery module 1722, a navigation module 1723, a photo module 1724, a facial recognition module 1725, and a compartment door control module 1726.

The communication module 1721 may receive at least one of the specific area data, the facial feature, and the compartment status. The communication module 1721 may receive at least one of the specific area data, the facial feature, and the compartment status from the sensor. In some embodiments, the communication module 1721 further receives an access authentication. The compartment door control module 1726 may further or alternatively direct the compartment actuator 1712 to open the compartment door based on the access authentication. In some embodiments, the autonomous or semi-autonomous vehicle 1710 further comprises a customer interface. The customer interface may be configured to receive a passcode. The customer interface may be further configured to transmit the access authentication to the communication module 1721. The customer interface may be further configured to transmit the access authentication to the communication module 1721 based on the passcode. In some embodiments, the fulfillment application 1720 further comprises a passcode module. The passcode module may generate the passcode. The passcode module may further submit the passcode to the customer. The passcode module may further authenticate the received password. In some embodiments, the customer interface comprises a button, a Wi-Fi device, a Bluetooth device, a camera, a cellular device, a satellite device, or any combination thereof. In some embodiments, the system further comprises a mobile processor associated with the customer and configured to provide a customer application.

In some embodiments, the customer application comprises a compartment activation module receiving a compartment activation request from the customer, an administrator, or both. In some embodiments, the customer application comprises a compartment activation module receiving a compartment activation request from the customer, an administrator, or both to open or close the compartment door. In some embodiments, the compartment activation module transmits the compartment activation request to the compartment door control module 1726. In some embodiments, the compartment activation module transmits the compartment activation request to the compartment door control module 1726 based on the compartment activation request. In some embodiments, the control module 1726 directs the compartment actuator 1712 to open the compartment door based on the compartment activation request only when the vehicle is at a complete stop, arrives at the customer address or the primary entrance location, or both. In some embodiments, the compartment activation module further receives a current location of the customer and a current location of the vehicle. In some embodiments, the control module 1726 directs the compartment actuator 1712 to open the compartment door based on the compartment activation request only when the current location of the customer is within a set proximity distance from the current location of the vehicle.

The direct delivery module 1722 may apply an object recognition algorithm. The object recognition algorithm may determine a primary entrance location. The object recognition algorithm may determine a primary entrance location based on the specific area data.

The navigation module 1723 may direct the autonomous or semi-autonomous propulsion system 1713 of the autonomous or semi-autonomous vehicle 1710. In some embodiments, the navigation module 1723 directs the autonomous or semi-autonomous propulsion system 1713 of the autonomous or semi-autonomous vehicle 1710 from the customer address to the primary entrance location. In some embodiments, the navigation module 1723 directs the autonomous or semi-autonomous propulsion system 1713 of the autonomous or semi-autonomous vehicle 1710 to a customer address.

The photo module 1724 may receive an image of the customer.

The facial recognition module 1725 may apply a facial recognition algorithm to the facial feature of the order recipient and the image of the customer. The facial recognition module 1725 may apply a facial recognition algorithm to the facial feature of the order recipient and the image of the customer to confirm that the order recipient corresponds to the customer.

The compartment door control module 1726 may select and implement a compartment door instruction. The compartment door instruction may comprise an open compartment door instruction or a close compartment door instruction. At least one of the open compartment door and the close compartment door instruction may be based on the compartment status. In some embodiments, the compartment status comprises at least one of an opened compartment status, a closed compartment status, an object blocking compartment status, a customer blocking compartment status an unblocked compartment status. In some embodiments, the compartment door control module 1726 select and implements the closed compartment door instruction. In some embodiments, the compartment door control module 1726 select and implements the closed compartment door instruction when the compartment status comprises the opened compartment status, the unblocked compartment status, or both. In some embodiments, the compartment door control module 1726 further selects and implements a pause compartment door instruction if the compartment status comprises the blocked compartment status. In some embodiments, the compartment door control module 1726 further selects and implements the pause compartment door instruction for a set waiting time period. In some embodiments, the compartment door control module 1726 further selects and implements the pause compartment door instruction if the compartment status comprises the blocked compartment status while the compartment door is being closed. In some embodiments, the compartment door control module 1726 further selects and implements the close compartment door instruction once the compartment status comprises the unblocked compartment status. In some embodiments, the compartment status further comprises an absent customer status, and wherein the compartment door control module 1726 select and implements the close compartment door instruction when the compartment status comprises the absent customer status. In some embodiments, the compartment door control module 1726 select and implements the close compartment door instruction when the compartment status comprises the absent customer status for a set period of absence.

In some embodiments, the compartment door control module 1726 only opens the compartment door when the vehicle is at a complete stop, arrives at the customer address or the primary entrance location, or both. In some embodiments, the compartment door control module 1726 further receives an administrator control command from an administrator, and wherein the compartment door control module 1726 further directs the compartment actuator 1712 to close the compartment door, open the compartment door, or both based on the administrator control command. In some embodiments, the autonomous or semi-autonomous vehicle 1710 further comprises a compartment interface configured to receive the compartment door instruction, confirm the compartment door instruction, or both. In some embodiments, the compartment interface comprises a button, a Wi-Fi device, a Bluetooth device, a camera, a cellular device, a satellite device, or any combination thereof. In some embodiments, the compartment interface is configured to receive the compartment door instruction from an administrator, the customer, or both. In some embodiments, the compartment interface is further configured to send the compartment status to the compartment door control module 1726 based on the compartment door instruction. In some embodiments, the compartment interface is configured to receive the compartment door instruction the customer via an SMS text message. In some embodiments, the system further comprises a mobile processor associated with the customer and configured to provide a customer application comprising a compartment door module configured to receive the compartment door instruction and transmit the compartment door instruction to the compartment interface.

In some embodiments the system further comprises a mobile processor associated with the customer and configured to provide a customer application. In some embodiments, the customer application comprises a primary entrance selection module. The primary entrance selection module may receive the primary entrance location from the customer. In some embodiments, the customer submits the primary entrance location to the primary entrance selection module by selecting a pinpoint location on a map. In some embodiments, the map comprises a satellite image map. In some embodiments, the fulfillment application 1720 further comprises a customer preference database module. The customer preference database module may store the pinpoint location. In some embodiments, the customer application comprises a customer image input module. The customer image input module may capture the image of the customer. The customer image input module may further transmit the image of the customer to the photo module 1724. The customer image input module may further save the image of the customer. In some embodiments, the image of the customer comprises a photograph of the customer, a photograph of an identification card associated with the customer, or both. In some embodiments, the application further comprises a live identification card authentication module. The live identification card authentication module may capture a live image of an identification card of the order recipient. The live identification card authentication module may further apply an identification card and text recognition algorithm. The identification card and text recognition algorithm may confirm that the identification card of the order recipient corresponds to the customer.

In some embodiments, each vehicle further comprises a vehicle identification module configured to direct a vehicle indicator aboard the vehicle to emit a vehicle identification media. In some embodiments, the vehicle indicator comprises a light, a display screen, a speaker, or any combination thereof. In some embodiments, the application further comprises an indicator activation module transmitting an indicator activation instruction to the vehicle identification module In some embodiments, the indicator activation instruction comprises an identification pattern and wherein the identification pattern is associated with the order, the customer, the vehicle, or any combination thereof. In some embodiments, the vehicle identification media comprises the identification pattern. In some embodiments, the indicator activation module transmits the indicator initiation instruction to the vehicle indicator when the autonomous or semi-autonomous vehicle 1710 is within a set indication distance from the customer address. In some embodiments, the system further comprises a mobile processor associated with the customer and configured to provide a customer application. In some embodiments, the customer application comprises an identification pattern display module receiving the identification pattern and displaying the identification pattern to the customer. In some embodiments, the customer application comprises an indicator activation module receiving an indicator activation request from the customer and transmitting the indicator activation request to the indicator activation module, wherein the indicator instruction further comprises the indicator activation request. In some embodiments, the customer application comprises a current vehicle position indication module displaying a current position of the vehicle, an estimated time of arrival, or both to the customer. In some embodiments, the wherein the current vehicle position indication module only displays the current position of the vehicle when the current position is within a set position display distance from the customer address or within a set position display time from the customer address.

In some embodiments, at least one of the object recognition algorithm and the facial recognition algorithm comprises a machine learning algorithm, a rule-based algorithm, or both.

Autonomous or Semi-Autonomous Vehicle

The autonomous or semi-autonomous vehicle may comprise a compartment, a compartment actuator, an autonomous or semi-autonomous propulsion system, and one or more sensors. The autonomous or semi-autonomous vehicle may comprise 2, 3, 4, 5, 6, 7, 8, 10, 12, 14, 18, 20, 25, 30, 35, 40, 50, or more sensors, including increments therein. The one or more sensors may be configured to measure a specific area data corresponding to a customer address associated with the order, a facial feature of an order recipient, and a compartment status of the compartment. In some embodiments, the sensor comprises a RADAR, a LiDAR, a camera, a video camera, a proximity sensor, a contact sensor, a light sensor, an infrared sensor, a switch, or any combination thereof. In some embodiments, the specific area data comprises a three-dimensional spatial data. In some embodiments, the primary entrance location comprises at least one of a door, an entranceway, a pathway, a garage door, a gate, an atrium, a foyer, a gateway, and a driveway.

Compartment

The autonomous or semi-autonomous vehicle may comprise 2, 3, 4, 5, 6, 7, 8, 10, 12, 14, 18, 20, 25, 30, 35, 40, 50, or more compartments, including increments therein. The compartment may be configured to secure an item associated with the order. The compartment actuator may be configured to open and close the compartment door. Each compartment may comprise may comprise 2, 3, 4, 5, 6, 7, 8, 9, 10, or more actuators. In some embodiments, the compartment actuator comprises a lock, a spring, a pneumatic cylinder, a motor, a gear, a pulley, a belt, a rack, a pinion, or any combination thereof. In some embodiments, the compartment further comprises an item removal sensor configured to detect removal of the item from the compartment. The compartment actuator may be configured to prevent damage to the item, hacking, breakings, or any combination thereof.

Fulfillment Application

The fulfillment application may comprise communication module, a direct delivery module, a navigation module, a photo module, a facial recognition module, and a compartment door control module. At least a portion of the fulfillment application may reside on the autonomous or semi-autonomous vehicle. At least a portion of the fulfillment application may comprise a server application located on a server.

Communication Module

The communication module may receive at least one of the specific area data, the facial feature, and the compartment status. The communication module may communicate through a communication device. The communication device may comprise a wired communication device, a wireless communication device, a Wi-Fi communication device, a Bluetooth communication device, or any combination thereof. The communication module may receive at least one of the specific area data, the facial feature, and the compartment status from the sensor. In some embodiments, the communication module further receives an access authentication. The compartment door control module may further or alternatively direct the compartment actuator to open the compartment door based on the access authentication. In some embodiments, the autonomous or semi-autonomous vehicle further comprises a customer interface. The customer interface may be configured to receive a passcode. The customer interface may be further configured to transmit the access authentication to the communication module. The customer interface may be further configured to transmit the access authentication to the communication module based on the passcode. In some embodiments, the fulfillment application further comprises a passcode module. The passcode module may generate the passcode. The passcode module may further submit the passcode to the customer. The passcode module may further authenticate the received password. In some embodiments, the customer interface comprises a button, a Wi-Fi device, a Bluetooth device, a camera, a cellular device, a satellite device, or any combination thereof. In some embodiments, the system further comprises a mobile processor associated with the customer and configured to provide a customer application.

Compartment Activation Module

In some embodiments, the customer application comprises a compartment activation module receiving a compartment activation request from the customer, an administrator, or both. In some embodiments, the customer application comprises a compartment activation module receiving a compartment activation request from the customer, an administrator, or both to open or close the compartment door. In some embodiments, the compartment activation module transmits the compartment activation request to the compartment door control module. In some embodiments, the compartment activation module transmits the compartment activation request to the compartment door control module based on the compartment activation request. In some embodiments, the control module directs the compartment actuator to open the compartment door based on the compartment activation request only when the vehicle is at a complete stop, arrives at the customer address or the primary entrance location, or both. In some embodiments, the compartment activation module further receives a current location of the customer and a current location of the vehicle. In some embodiments, the control module directs the compartment actuator to open the compartment door based on the compartment activation request only when the current location of the customer is within a set proximity distance from the current location of the vehicle.

Direct Delivery Module

The direct delivery module may apply an object recognition algorithm. The object recognition algorithm may determine a primary entrance location. The object recognition algorithm may determine a primary entrance location based on the specific area data. The object recognition algorithm may comprise a machine learning algorithm, a rule-based algorithm, or both. The object recognition algorithm may be tailored to recognize objects associated with autonomous or semi-autonomous navigation.

Primary Entrance Location

The primary entrance location may comprise at least one of a door, an entranceway, a pathway, a garage door, a gate, an atrium, a foyer, a gateway, a sidewalk, a street, and a driveway. In some embodiments, the primary entrance location comprises any entranceway by which the customer would receive a delivery directly from a delivery person. In some embodiments, the primary entrance comprises be the closest entrance to the household that does not comprise a lock. In some embodiments, the primary entrance may not comprise a lever or knob to open the primary entrance. In some embodiments, the primary entrance may be identified as an entrance having a large door, a colored door, a windowed door, a window, or any combination thereof.

Navigation Module

The navigation module may direct the autonomous or semi-autonomous propulsion system of the autonomous or semi-autonomous vehicle. The navigation module may direct the autonomous or semi-autonomous propulsion system of the autonomous or semi-autonomous vehicle from the customer address to the primary entrance location. The navigation module may direct the autonomous or semi-autonomous propulsion system of the autonomous or semi-autonomous vehicle from the customer address to the primary entrance location via a sidewalk, path, grass area, field, yard, driveway, or any combination thereof.

Photo Module

The photo module may receive an image of the customer. The image may be captured by a camera of the customer. The mobile application may be configured to receive the image. The image of the customer may comprise multiple images.

Facial Recognition Module

The facial recognition module may apply a facial recognition algorithm to the facial feature of the order recipient and the image of the customer. The facial recognition module may apply a facial recognition algorithm to the facial feature of the order recipient and the image of the customer to confirm that the order recipient corresponds to the customer. The facial recognition algorithm may be a machine learning algorithm, a rule based algorithm, or both.

Compartment Door Control Module

The compartment door control module may select and implement a compartment door instruction. The compartment door instruction may comprise an open compartment door instruction or a close compartment door instruction. At least one of the open compartment door and the close compartment door instruction may be based on the compartment status. In some embodiments, the compartment status comprises at least one of an opened compartment status, a closed compartment status, an object blocking compartment status, a customer blocking compartment status an unblocked compartment status. In some embodiments, the compartment door control module select and implements the closed compartment door instruction. In some embodiments, the compartment door control module select and implements the closed compartment door instruction when the compartment status comprises the opened compartment status, the unblocked compartment status, or both. In some embodiments, the compartment door control module further selects and implements a pause compartment door instruction if the compartment status comprises the blocked compartment status. In some embodiments, the compartment door control module further selects and implements the pause compartment door instruction for a set waiting time period. In some embodiments, the compartment door control module further selects and implements the pause compartment door instruction if the compartment status comprises the blocked compartment status while the compartment door is being closed. In some embodiments, the compartment door control module further selects and implements the close compartment door instruction once the compartment status comprises the unblocked compartment status. In some embodiments, the compartment status further comprises an absent customer status, and wherein the compartment door control module select and implements the close compartment door instruction when the compartment status comprises the absent customer status. In some embodiments, the compartment door control module select and implements the close compartment door instruction when the compartment status comprises the absent customer status for a set period of absence. The set period of absence may be about 0.5, 1, 2, 3, 4, 5, 6, 7, 8, 10 or more minutes, including increments therein.

In some embodiments, the compartment door control module only opens the compartment door when the vehicle is at a complete stop, arrives at the customer address or the primary entrance location, or both. In some embodiments, the compartment door control module further receives an administrator control command from an administrator, and wherein the compartment door control module further directs the compartment actuator to close the compartment door, open the compartment door, or both based on the administrator control command. In some embodiments, the autonomous or semi-autonomous vehicle further comprises a compartment interface configured to receive the compartment door instruction, confirm the compartment door instruction, or both. In some embodiments, the compartment interface comprises a button, a Wi-Fi device, a Bluetooth device, a camera, a cellular device, a satellite device, or any combination thereof. In some embodiments, the compartment interface is configured to receive the compartment door instruction from an administrator, the customer, or both. In some embodiments, the compartment interface is further configured to send the compartment status to the compartment door control module based on the compartment door instruction. In some embodiments, the compartment interface is configured to receive the compartment door instruction the customer via an SMS text message. In some embodiments, the system further comprises a mobile processor associated with the customer and configured to provide a customer application comprising a compartment door module configured to receive the compartment door instruction and transmit the compartment door instruction to the compartment interface.

Mobile Processor Associated With the Customer

In some embodiments the system further comprises a mobile processor associated with the customer and configured to provide a customer application. In some embodiments, the customer application comprises a primary entrance selection module. The primary entrance selection module may receive the primary entrance location from the customer. In some embodiments, the customer submits the primary entrance location to the primary entrance selection module by selecting a pinpoint location on a map. In some embodiments, the map comprises a satellite image map. In some embodiments, the fulfillment application further comprises a customer preference database module. The customer preference database module may store the pinpoint location. In some embodiments, the customer application comprises a customer image input module. The customer image input module may capture the image of the customer. The customer image input module may further transmit the image of the customer to the photo module. The customer image input module may further save the image of the customer. In some embodiments, the image of the customer comprises a photograph of the customer, a photograph of an identification card associated with the customer, or both. In some embodiments, the application further comprises a live identification card authentication module. The live identification card authentication module may capture a live image of an identification card of the order recipient. The identification card authentication module may further apply an identification card and text recognition algorithm. The identification card and text recognition algorithm may confirm that the identification card of the order recipient corresponds to the customer.

Vehicle Identification Module

In some embodiments, each vehicle further comprises a vehicle identification module configured to direct a vehicle indicator aboard the vehicle to emit a vehicle identification media. In some embodiments, the vehicle indicator comprises a light, a display screen, a speaker, or any combination thereof. In some embodiments, the application further comprises an indicator activation module transmitting an indicator activation instruction to the vehicle identification module In some embodiments, the indicator activation instruction comprises an identification pattern and wherein the identification pattern is associated with the order, the customer, the vehicle, or any combination thereof. In some embodiments, the vehicle identification media comprises the identification pattern. In some embodiments, the indicator activation module transmits the indicator initiation instruction to the vehicle indicator when the autonomous or semi-autonomous vehicle is within a set indication distance from the customer address. In some embodiments, the system further comprises a mobile processor associated with the customer and configured to provide a customer application. In some embodiments, the customer application comprises an identification pattern display module receiving the identification pattern and displaying the identification pattern to the customer. In some embodiments, the customer application comprises an indicator activation module receiving an indicator activation request from the customer and transmitting the indicator activation request to the indicator activation module, wherein the indicator instruction further comprises the indicator activation request. In some embodiments, the customer application comprises a current vehicle position indication module displaying a current position of the vehicle, an estimated time of arrival, or both to the customer. In some embodiments, the wherein the current vehicle position indication module only displays the current position of the vehicle when the current position is within a set position display distance from the customer address or within a set position display time from the customer address.

In some embodiments, at least one of the object recognition algorithm and the facial recognition algorithm comprises a machine learning algorithm, a rule-based algorithm, or both.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for autonomous or semi-autonomous vehicles. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

As used herein, the phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, the terms "fleet," "sub-fleet," and like terms are used to indicate a number of land vehicles, watercraft, or aircraft operating together or under the same ownership. In some embodiments the fleet or sub-fleet is engaged in the same activity. In some embodiments, the fleet or sub-fleet are engaged in similar activities. In some embodiments, the fleet, or sub-fleet are engaged in different activities.

As used herein, the terms "autonomous or semi-autonomous vehicle," "autonomous or semi-autonomous vehicle fleet," "vehicle," "all-terrain vehicle," and like terms are used to indicate a mobile machine that transports cargo. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the terms "user," "operator," "fleet operator," and like terms are used to indicate the entity that owns or is responsible for managing and operating the autonomous or semi-autonomous vehicle fleet.

As used herein, the term "customer" and like terms are used to indicate the entity that requests the services provided the autonomous or semi-autonomous vehicle fleet.

As used herein, the terms "provider," "business," "vendor," "third party vendor," and like terms are used to indicate an entity that works in concert with the fleet owner or operator to utilize the services of the autonomous or semi-autonomous vehicle fleet to deliver the provider's product from and or return the provider's product to the provider's place of business or staging location.

As used herein, the terms "server," "computer server," "central server," "main server," and like terms are used to indicate a computer or device on a network that manages the fleet resources, namely the autonomous or semi-autonomous vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the autonomous or semi-autonomous vehicle such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn comprises software modules. In software, a module is a part of a program. Programs are composed of one or more independently developed modules that are not combined until the program is linked. A single module can contain one or several routines, or sections of programs that perform a particular task. As used herein the fleet management module comprises software modules for managing various aspects and functions of the autonomous or semi-autonomous vehicle fleet.

As used herein, the terms "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

What is claimed is:

1. A system for direct fulfillment of an order to a customer, the system comprising:
   a) an autonomous or semi-autonomous vehicle comprising:
      (i) a compartment having a compartment door, wherein the compartment is configured to secure an item associated with the order;
      (ii) a compartment actuator configured to open and close the compartment door;
      (iii) an autonomous or semi-autonomous propulsion system; and
      (iv) one or more sensors configured to measure:
         i) a specific area data corresponding to a customer address associated with the order; and
         ii) a compartment status of the compartment, wherein the compartment status comprises at least one of an opened compartment status, a closed compartment status, an object blocking compartment status, a customer blocking compartment status, and an unblocked compartment status; and
   b) the system further comprising a processor configured to provide a fulfillment application comprising:
      (i) a communication module receiving at least one of the specific area data and the compartment status;
      (ii) a navigation module directing the autonomous or semi-autonomous propulsion system of the autonomous or semi-autonomous vehicle to the customer address; and
      (iii) a compartment door control module selecting and implementing a compartment door instruction, wherein the compartment door instruction comprises an open compartment door instruction or a close compartment door instruction based on the compartment status, the compartment door control module further selecting and implementing a pause compartment door instruction for a set waiting period if the compartment status comprises the blocked compartment status, the compartment door control module further selecting and implementing the pause compartment door instruction if the compartment status comprises the blocked compartment status while the compartment door is being closed, and the compartment door control module further selecting and implementing the close compartment door instruction once the compartment status comprises the unblocked compartment status; and c) a mobile processor associated with the customer and configured to provide a customer application.

2. The system of claim 1, wherein the fulfillment application further comprises a direct delivery module applying an object recognition algorithm to determine a primary entrance location based on the specific area data, and wherein the navigation module further directing the autonomous or semi-autonomous propulsion system of the autonomous or semi-autonomous vehicle from the customer address to the primary entrance location.

3. The system of claim 1, wherein the one or more sensors comprise a RADAR, a LiDAR, a camera, a video camera, a proximity sensor, a contact sensor, a light sensor, an infrared sensor, a switch, or any combination thereof.

4. The system of claim 1, wherein the specific area data comprises a three-dimensional spatial data.

5. The system of claim 2, wherein the primary entrance location comprises at least one of a door, an entranceway, a pathway, a garage door, a gate, an atrium, a foyer, a gateway, and a driveway.

6. The system of claim 2, wherein the customer application comprises a primary entrance selection module receiving the primary entrance location from the customer, wherein the customer submits the primary entrance location to the primary entrance selection module by selecting a pinpoint location on a map, and wherein the fulfillment application further comprises a customer preference database module storing the pinpoint location.

7. The system of claim 6, wherein the map comprises a satellite image map.

8. The system of claim 1, wherein the fulfillment application further comprises a photo module receiving an image of the customer, wherein the one or more sensors are further configured to measure a facial feature of the order recipient, and wherein the communication module further receives the facial feature, wherein the fulfillment application further comprises a facial recognition module applying a facial recognition algorithm to the facial feature of the order recipient and the image of the customer to confirm that the order recipient corresponds to the customer, wherein the compartment door control module selects and implements the compartment door instruction based on the confirmation, and wherein the customer application comprises a customer image input module capturing the image of the customer, transmitting the image of the customer to the photo module, and saving the image of the customer.

9. The system of claim 8, wherein the image of the customer comprises a photograph of the customer, a photograph of an identification card associated with the customer, or both.

10. The system of claim 1, wherein the fulfillment application further comprises a live identification card authentication module capturing a live image of an identification card of the order recipient, applying an identification card and text recognition algorithm to confirm that the identification card of the order recipient corresponds to the customer.

11. The system of claim 1, wherein the communication module further receives an access authentication, and wherein the compartment door control module further or alternatively directs the compartment actuator to open the compartment door based on the access authentication.

12. The system of claim 11, wherein the autonomous or semi-autonomous vehicle further comprises a customer interface configured to receive a passcode and transmit the access authentication to the communication module based on the passcode.

13. The system of claim 12, wherein the fulfillment application further comprises a passcode module generating the passcode, submitting the passcode to the customer, and authenticating the received password.

14. The system of claim 1, wherein the customer application comprises a compartment activation module receiving a compartment activation request from the customer, an administrator, or both to open or close the compartment door, and transmitting the compartment activation request to the compartment door control module based on the compartment activation request.

15. The system of claim 14, wherein the compartment activation module further receives a current location of the customer and a current location of the vehicle, and wherein the compartment door control module directs the compartment actuator to open the compartment door based on the compartment activation request only when the current location of the customer is within a set proximity distance from the current location of the vehicle.

16. The system of claim 1, wherein each vehicle further comprises a vehicle identification module configured to direct a vehicle indicator aboard the vehicle to emit a vehicle identification media, wherein the fulfillment application further comprises an indicator activation module transmitting an indicator activation instruction to the vehicle identification module, and wherein the indicator activation instruction comprises an identification pattern, wherein the identification pattern is associated with the order, the customer, the vehicle, or any combination thereof, wherein the vehicle identification media comprises the identification pattern, and wherein the customer application comprises an identification pattern display module receiving the identification pattern and displaying the identification pattern to the customer.

17. The system of claim 16, wherein the vehicle indicator comprises a light, a display screen, a speaker, a car horn, or any combination thereof.

18. The system of claim 16, wherein the indicator activation module transmits the indicator initiation instruction to the vehicle indicator when the autonomous or semi-autonomous vehicle is within a set indication distance from the customer address.

19. The system of claim 1, wherein the customer application comprises an indicator activation module receiving an indicator activation request from the customer and transmitting the indicator activation request to the indicator activation module, wherein the indicator instruction further comprises the indicator activation request.

20. The system of claim 1, wherein the customer application comprises a current vehicle position indication module displaying a current position of the vehicle, an estimated time of arrival, or both to the customer, and wherein the current vehicle position indication module only displays the current position of the vehicle when the current position is within a set position display distance from the customer address or within a set position display time from the customer address.

21. The system of claim 1, wherein the compartment status further comprises an absent customer status, and wherein the compartment door control module selects and implements the close compartment door instruction when the compartment status comprises the absent customer status, and wherein the compartment door control module select and implements the close compartment door instruction when the compartment status comprises the absent customer status for a set period of absence.

22. The system of claim 2, wherein the compartment door control module only opens the compartment door when the vehicle is at a complete stop, arrives at the customer address or the primary entrance location, or both.

23. The system of claim 1, wherein the compartment door control module further receives an administrator control command from an administrator, and wherein the compartment door control module further directs the compartment actuator to close the compartment door, open the compartment door, or both based on the administrator control command.

24. The system of claim 1, wherein the autonomous or semi-autonomous vehicle further comprises a compartment interface configured to receive the compartment door instruction, confirm the compartment door instruction, or both.

25. The system of claim 24, wherein the compartment interface comprises a button, a Wi-Fi device, a Bluetooth device, a camera, a cellular device, a satellite device, or any combination thereof, wherein the compartment interface is configured to receive the compartment door instruction from an administrator, the customer, or both, and wherein the compartment interface is further configured to send the compartment status to the compartment door control module based on the compartment door instruction.

26. The system of claim 24, wherein the customer application comprises a compartment door module configured to receive the compartment door instruction and transmit the compartment door instruction to the compartment interface.

27. The system of claim 1, wherein the compartment further comprises an item removal sensor configured to detect removal of the item from the compartment.

28. The system of claim 2, wherein the object recognition algorithm comprises a machine learning algorithm, a rule-based algorithm, or both.

29. The system of claim 8, wherein the facial recognition algorithm comprises a machine learning algorithm, a rule-based algorithm, or both.

30. A system for direct fulfillment of an order to a customer, the system comprising:
  a) an autonomous or semi-autonomous vehicle comprising:
    (i) a compartment having a compartment door, wherein the compartment is configured to secure an item associated with the order;
    (ii) a compartment actuator configured to open and close the compartment door;
    (iii) an autonomous or semi-autonomous propulsion system; and
    (iv) one or more sensors configured to measure:
      i) a specific area data corresponding to a customer address associated with the order; and
      ii) a compartment status of the compartment, wherein the compartment status comprises at least one of an opened compartment status, a closed compartment status, an object blocking compartment status, a customer blocking compartment status, and an unblocked compartment status, and wherein the compartment status further comprises an absent customer status; and
  b) a processor configured to provide a fulfillment application comprising:
    (i) a communication module receiving at least one of the specific area data and the compartment status;
    (ii) a navigation module directing the autonomous or semi-autonomous propulsion system of the autonomous or semi-autonomous vehicle to the customer address; and
    (iii) a compartment door control module selecting and implementing a compartment door instruction, wherein the compartment door instruction comprises an open compartment door instruction or a close compartment door instruction based on the compartment status, the compartment door control module further selecting and implementing the close compartment door instructions when the compartment status comprises the absent customer status, and the compartment door control module further selecting and implementing the close compartment door instruction when the compartment status comprises the absent customer status for a set period of absence; and
  c) a mobile processor associated with the customer and configured to provide a customer application.

31. The system of claim 30, wherein the fulfillment application further comprises a direct delivery module applying an object recognition algorithm to determine a primary entrance location based on the specific area data, and wherein the navigation module further directing the autonomous or semi-autonomous propulsion system of the autonomous or semi-autonomous vehicle from the customer address to the primary entrance location.

32. The system of claim 30, wherein the one or more sensors comprise a RADAR, a LiDAR, a camera, a video camera, a proximity sensor, a contact sensor, a light sensor, an infrared sensor, a switch, or any combination thereof.

33. The system of claim 30, wherein the specific area data comprises a three-dimensional spatial data.

34. The system of claim 31, wherein the primary entrance location comprises at least one of a door, an entranceway, a pathway, a garage door, a gate, an atrium, a foyer, a gateway, and a driveway.

35. The system of claim 31, wherein the customer application further comprises a primary entrance selection module receiving the primary entrance location from the customer, wherein the customer submits the primary entrance location to the primary entrance selection module by selecting a pinpoint location on a map, and wherein the fulfillment application further comprises a customer preference database module storing the pinpoint location.

36. The system of claim 35, wherein the map comprises a satellite image map.

37. The system of claim 30, wherein the fulfillment application further comprises a photo module receiving an image of the customer, wherein the one or more sensors are further configured to measure a facial feature of the order recipient, and wherein the communication module further receives the facial feature, wherein the fulfillment application further comprises a facial recognition module applying a facial recognition algorithm to the facial feature of the order recipient and the image of the customer to confirm that the order recipient corresponds to the customer, wherein the compartment door control module selects and implements the compartment door instruction based on the confirmation, and wherein the customer application comprises a customer image input module capturing the image of the customer, transmitting the image of the customer to the photo module, and saving the image of the customer.

38. The system of claim 37, wherein the image of the customer comprises a photograph of the customer, a photograph of an identification card associated with the customer, or both.

39. The system of claim 30, wherein the fulfillment application further comprises a live identification card authentication module capturing a live image of an identification card of the order recipient, applying an identification card and text recognition algorithm to confirm that the identification card of the order recipient corresponds to the customer.

40. The system of claim 30, wherein the communication module further receives an access authentication, and wherein the compartment door control module further or alternatively directs the compartment actuator to open the compartment door based on the access authentication.

41. The system of claim 40, wherein the autonomous or semi-autonomous vehicle further comprises a customer interface configured to receive a passcode and transmit the access authentication to the communication module based on the passcode.

42. The system of claim 41, wherein the fulfillment application further comprises a passcode module generating the passcode, submitting the passcode to the customer, and authenticating the received password.

43. The system of claim 30, wherein the customer application comprises a compartment activation module receiving a compartment activation request from the customer, an administrator, or both to open or close the compartment door, and transmitting the compartment activation request to the compartment door control module based on the compartment activation request.

44. The system of claim 43, wherein the compartment activation module further receives a current location of the customer and a current location of the vehicle, and wherein the compartment door control module directs the compartment actuator to open the compartment door based on the compartment activation request only when the current location of the customer is within a set proximity distance from the current location of the vehicle.

45. The system of claim 30, wherein each vehicle further comprises a vehicle identification module configured to direct a vehicle indicator aboard the vehicle to emit a vehicle identification media, wherein the fulfillment application further comprises an indicator activation module transmitting an indicator activation instruction to the vehicle identification module, and wherein the indicator activation instruction comprises an identification pattern, wherein the identification pattern is associated with the order, the customer, the vehicle, or any combination thereof, wherein the vehicle identification media comprises the identification pattern, and wherein the customer application comprises an identification pattern display module receiving the identification pattern and displaying the identification pattern to the customer.

46. The system of claim 45, wherein the vehicle indicator comprises a light, a display screen, a speaker, a car horn, or any combination thereof.

47. The system of claim 45, wherein the indicator activation module transmits the indicator initiation instruction to the vehicle indicator when the autonomous or semi-autonomous vehicle is within a set indication distance from the customer address.

48. The system of claim 30, wherein the customer application comprises an indicator activation module receiving an indicator activation request from the customer and transmitting the indicator activation request to the indicator activation module, wherein the indicator instruction further comprises the indicator activation request.

49. The system of claim 30, wherein the customer application comprises a current vehicle position indication module displaying a current position of the vehicle, an estimated time of arrival, or both to the customer, and wherein the current vehicle position indication module only displays the current position of the vehicle when the current position is within a set position display distance from the customer address or within a set position display time from the customer address.

50. The system of claim 31, wherein the compartment door control module only opens the compartment door when the vehicle is at a complete stop, arrives at the customer address or the primary entrance location, or both.

51. The system of claim 30, wherein the compartment door control module further receives an administrator control command from an administrator, and wherein the compartment door control module further directs the compartment actuator to close the compartment door, open the compartment door, or both based on the administrator control command.

52. The system of claim 30, wherein the autonomous or semi-autonomous vehicle further comprises a compartment interface configured to receive the compartment door instruction, confirm the compartment door instruction, or both.

53. The system of claim 52, wherein the compartment interface comprises a button, a Wi-Fi device, a Bluetooth device, a camera, a cellular device, a satellite device, or any combination thereof, wherein the compartment interface is configured to receive the compartment door instruction from an administrator, the customer, or both, and wherein the compartment interface is further configured to send the compartment status to the compartment door control module based on the compartment door instruction.

54. The system of claim 52, wherein the customer application comprises a compartment door module configured to receive the compartment door instruction and transmit the compartment door instruction to the compartment interface.

55. The system of claim 1, wherein the compartment further comprises an item removal sensor configured to detect removal of the item from the compartment.

56. The system of claim 31, wherein the object recognition algorithm comprises a machine learning algorithm, a rule-based algorithm, or both.

57. The system of claim 37, wherein the facial recognition algorithm comprises a machine learning algorithm, a rule-based algorithm, or both.

* * * * *